United States Patent
Akiyama

(10) Patent No.: US 12,330,253 B2
(45) Date of Patent: Jun. 17, 2025

(54) PROCESSING MACHINE AND PRODUCTION METHOD FOR OBJECT SUBJECT TO PROCESSING

(71) Applicant: SHIBAURA MACHINE CO., LTD., Tokyo (JP)

(72) Inventor: Takanobu Akiyama, Shizuoka (JP)

(73) Assignee: SHIBAURA MACHINE CO., LTD., Tokyo (JP)

( * ) Notice: Subject to any disclaimer, the term of this patent is extended or adjusted under 35 U.S.C. 154(b) by 127 days.

(21) Appl. No.: 18/248,282

(22) PCT Filed: Sep. 14, 2021

(86) PCT No.: PCT/JP2021/033661
§ 371 (c)(1),
(2) Date: Apr. 7, 2023

(87) PCT Pub. No.: WO2022/080062
PCT Pub. Date: Apr. 21, 2022

(65) Prior Publication Data
US 2023/0405752 A1    Dec. 21, 2023

(30) Foreign Application Priority Data
Oct. 13, 2020   (JP) ................. 2020-172427

(51) Int. Cl.
*B23Q 15/22*   (2006.01)
*B23Q 17/20*   (2006.01)
*B23Q 17/22*   (2006.01)

(52) U.S. Cl.
CPC ............. *B23Q 15/22* (2013.01); *B23Q 17/20* (2013.01); *B23Q 17/2233* (2013.01)

(58) Field of Classification Search
CPC .... B23Q 15/22; B23Q 17/20; B23Q 17/2233; B23Q 17/00; B23Q 17/22; Y02P 90/02; G05B 19/404
See application file for complete search history.

(56) References Cited

U.S. PATENT DOCUMENTS 5,214,592 A * 5/1993 Serizawa ........... B23Q 11/0028
                                                       409/80
5,348,431 A    9/1994 Kusunoki et al.
(Continued)

FOREIGN PATENT DOCUMENTS

JP    11-042535    2/1990
JP    05-069276    3/1993
(Continued)

OTHER PUBLICATIONS

International Search Report in Application No. PCT/JP2021/033661, dated Nov. 22, 2021.
(Continued)

*Primary Examiner* — Sarang Afzali
*Assistant Examiner* — Darrell C Ford
(74) *Attorney, Agent, or Firm* — DLA Piper LLP (US)

(57) ABSTRACT

A control device of a processing machine controls a first drive source based on detection values from a first sensor so that a reference workpiece other than a workpiece is processed from a first direction by a tool into a prescribed target shape. The control device measures a shape of the reference workpiece based on a detection value from the first sensor at the time when contact in the first direction of a touch sensor with the processed reference workpiece by the touch sensor. The control device specifies a first deviation amount of a position of the tool in the X-direction based on a deviation amount in the first direction between the target shape and the
(Continued)

measured shape, and corrects control for processing the workpiece based on the specified first deviation amount.

14 Claims, 12 Drawing Sheets

(56) References Cited

U.S. PATENT DOCUMENTS

| | | | | |
|---|---|---|---|---|
| 5,459,915 A | * | 10/1995 | Mendenhall | G05B 19/4015 |
| | | | | 29/38 A |
| 2016/0243663 A1 | | 8/2016 | Kume et al. | |
| 2016/0274565 A1 | * | 9/2016 | Vesco | B23Q 1/012 |
| 2017/0017226 A1 | * | 1/2017 | Yamazaki | B23Q 17/2471 |
| 2017/0038760 A1 | * | 2/2017 | Compagnat | B24B 49/10 |
| 2017/0242422 A1 | * | 8/2017 | Ito | G05B 19/404 |
| 2017/0297160 A1 | * | 10/2017 | Matsushita | B23Q 17/2233 |
| 2018/0369977 A1 | * | 12/2018 | Hammond | G01B 21/042 |
| 2019/0171176 A1 | | 6/2019 | Ma et al. | |

FOREIGN PATENT DOCUMENTS

| | | |
|---|---|---|
| JP | 5-104397 | 4/1993 |
| JP | 2008-073813 | 4/2008 |
| JP | 2009-056557 | 3/2009 |
| JP | 2017-117282 A | 6/2017 |
| JP | 2018-030195 A | 3/2018 |
| WO | WO 2015/072273 | 5/2015 |

OTHER PUBLICATIONS

Written Opinion in Application No. PCT/JP2021/033661, dated Nov. 22, 2021.

* cited by examiner

FIG. 1
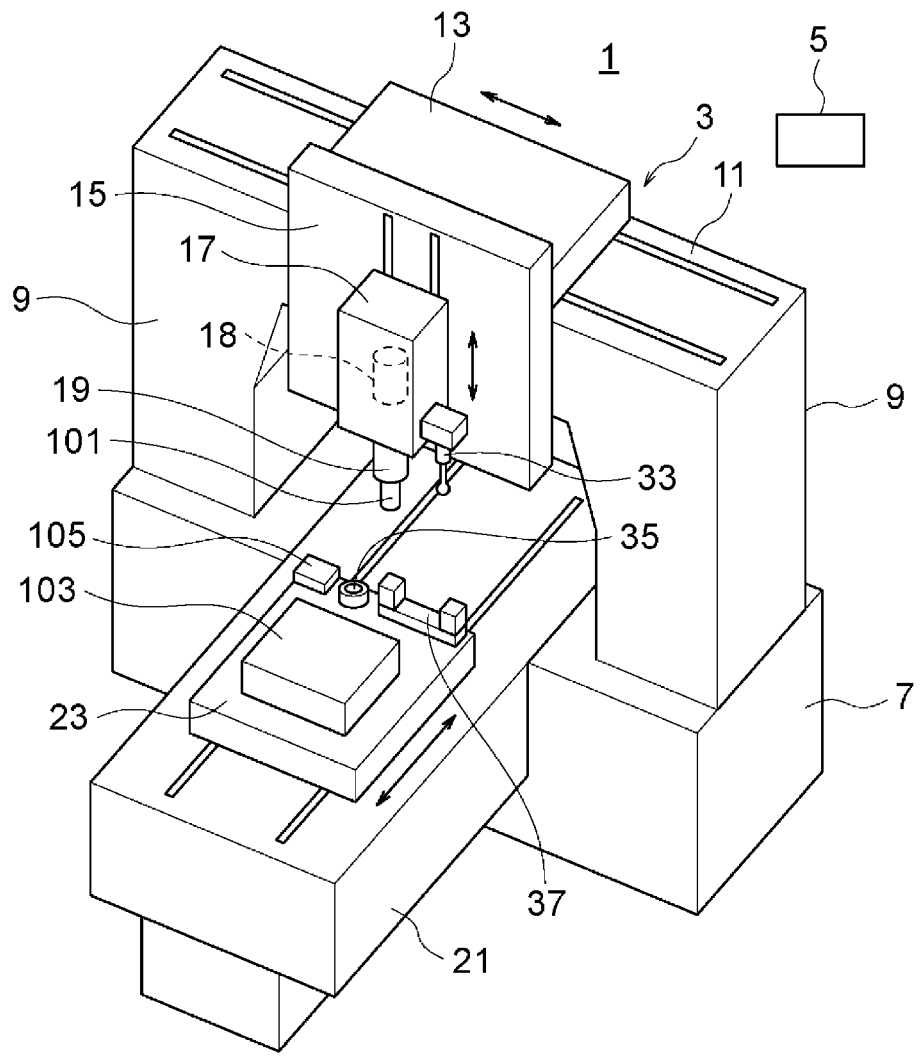
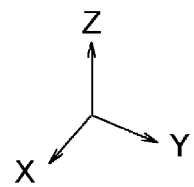

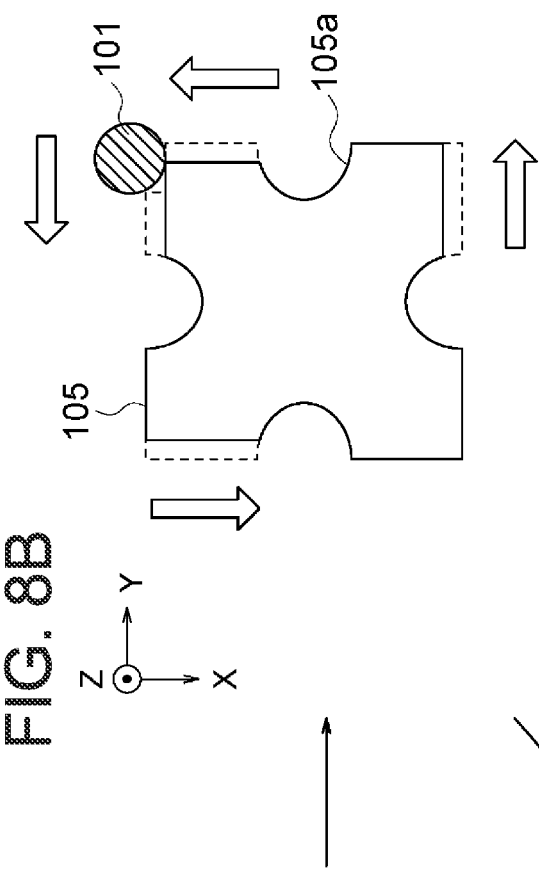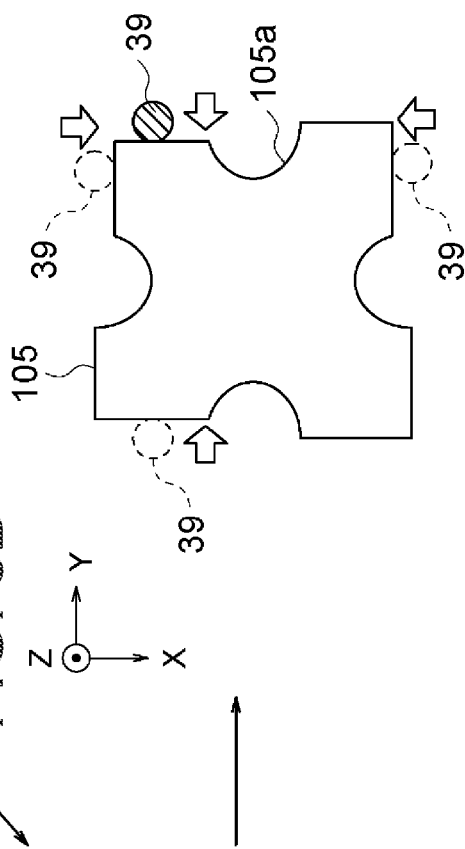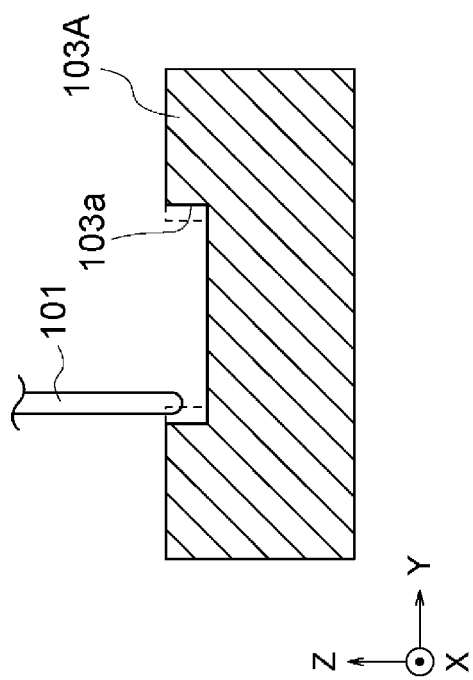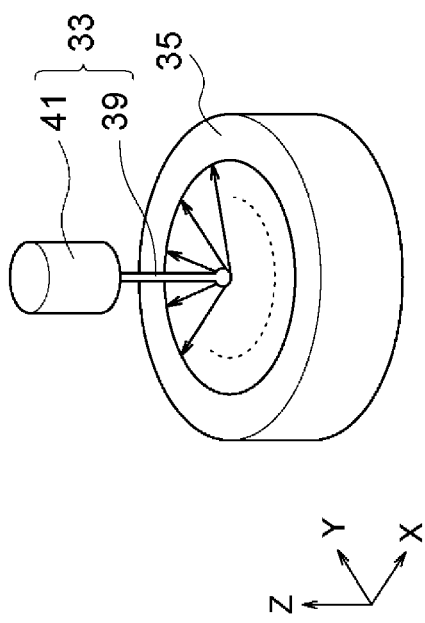
FIG. 8A
FIG. 8B
FIG. 8C
FIG. 8D

PROCESSING MACHINE AND PRODUCTION METHOD FOR OBJECT SUBJECT TO PROCESSING

CROSS REFERENCE TO RELATED APPLICATIONS

This application is a U.S. National Stage Application of International Application No. PCT/JJP2021/033661 filed Sep. 14, 2021, which claims priority from Japan Patent Application No. 2020-172427 filed Oct. 13, 2023. The entirety of all the above-listed applications are incorporated herein by reference.

TECHNICAL FIELD

The present disclosure relates to a processing machine and a method for manufacturing a processed object.

BACKGROUND ART

Known in the art is a processing machine for processing a workpiece by a tool. Such a processing machine for example has a position sensor which detects relative positions in a three-dimensional coordinate system of a tool holding part (for example a spindle) which holds the tool and a workpiece holding part (for example a table) which holds a workpiece. Further, the processing machine performs positioning of the tool and the workpiece for processing based on the detection value of the position sensor.

In the processing machine as described above, one having a touch sensor is known (for example the following PTL 1 and PTL 2). The touch sensor is generally utilized for measurement of the position of the workpiece (from another viewpoint, the shape of the workpiece). For example, the touch sensor is attached to the spindle in place of the tool or is fixed to a spindle head holding the spindle. Due to this, the touch sensor, in the same way as the tool, relatively moves with respect to the workpiece. This relative movement is detected by the position sensor. The touch sensor detects contact of the touch sensor against the workpiece. Accordingly, by acquiring the detection value of the position sensor at the time when contact against the workpiece is detected by the touch sensor, the position of the workpiece can be measured.

CITATION LIST

Patent Literature

PTL 1: Japanese Patent Publication No. 2017-117282
PTL 2: Japanese Patent Publication No. 2018-30195

SUMMARY OF INVENTION

Technical Problem

The processing machine, for example, controls the position of the tool based on the detection value of the position sensor predicated on a certain correspondence being present between the position of the tool and the detection value of the position sensor. However, due to a temperature change etc. of the processing machine, sometimes the correspondence between the position of the tool and the detection value of the position sensor deviates from the above correspondence. As a result, a processing precision of the processing machine falls.

Accordingly, a processing machine and a method for manufacturing a processed object which enable measurement of an amount of deviation of a tool (amount of deviation from the above certain correspondence) are being awaited.

Solution to Problem

A processing machine according to one aspect of the present disclosure includes a workpiece holding part which holds a workpiece, a tool holding part which holds a tool, a first drive source which makes the workpiece holding part and the tool holding part relatively move in a first direction, a first sensor which detects relative positions of the workpiece holding part and the tool holding part in the first direction, a touch sensor which is arranged at a position having a certain positional relationship with the tool holding part and thereby relatively moves in the first direction with respect to the workpiece holding part along with the relative movements of the workpiece holding part and the tool holding part in the first direction by the first drive source, a control device which controls the first drive source based on the detection value of the first sensor, and a reference workpiece holding part which holds a reference workpiece for measuring the deviation of the position of the tool and relatively moves in the first direction with respect to the tool holding part along with the relative movements of the workpiece holding part and the tool holding part in the first direction by the first drive source, the control device including a processing control part which performs control of the first drive source based on the detection value of the first sensor and thereby processes the workpiece by the tool, and a correction part which corrects the control of the processing control part, the correction part including a reference workpiece processing part which controls the first drive source based on the detection value of the first sensor so that the reference workpiece is processed from the first direction by the tool and becomes a predetermined target shape, a reference workpiece measurement part which measures the shape of the reference workpiece based on stored touch sensor position information showing the correspondence between the position of the touch sensor and the detection value of the first sensor and on the detection value of the first sensor at the time when contact in the first direction of the touch sensor with respect to the reference workpiece after processing is detected by the touch sensor, a tool deviation identification part which identifies a first amount of deviation of the position of the tool in the first direction based on an amount of deviation in the first direction between the target shape and the measurement shape, and a correction processing part which corrects the control of the processing control part based on the identified first amount of deviation.

A method for manufacturing a processed object according to an aspect of the present disclosure includes a step of using the processing machine to bring the workpiece and the tool into contact to process the workpiece into a processed object.

Advantageous Effect of Invention

According to the above configuration or procedures, an amount of deviation of a position of a tool can be measured.

BRIEF DESCRIPTION OF DRAWINGS

FIG. 1 is a schematic perspective view showing the configuration of a processing machine according to an embodiment.

FIG. 8A, FIG. 8B, FIG. 8C, and FIG. 8D are views showing a continuation of FIG. 7D.

DESCRIPTION OF EMBODIMENTS

Figure 2A:
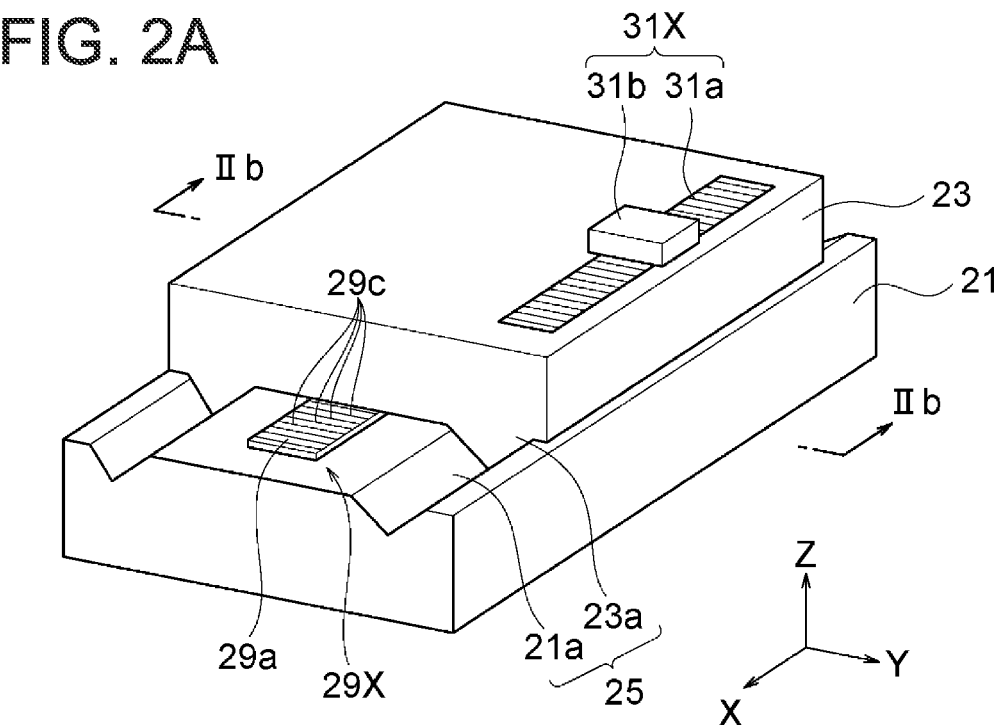
FIG. 2A is a perspective view showing an example of the configuration of linearly moving a table in the processing machine in FIG. 1.

In the following explanation, for convenience, the term "position of the tool" sometimes designates the relative position with respect to the workpiece, and sometimes designates the position in an absolute coordinate system. Unless particularly explained otherwise or a contradiction arises, the position of the tool may be grasped as any of the relative position and absolute position. The same is true for the touch sensor and other components. Further, for convenience, sometimes the image and the image data will not be strictly differentiated. The term "image" and the term "image data" may be replaced by each other unless particularly explained otherwise or a contradiction arises.

FIG. 1 is a schematic perspective view showing the configuration of a processing machine 1 according to an embodiment. To the view, for convenience, an orthogonal coordinate system XYZ is attached. The +Z direction is for example vertically upward.

The processing machine 1 performs processing of a workpiece 103 by a tool 101. The processing machine 1 measures the amount of deviation of the position of the tool 101 by utilizing a touch sensor 33 etc. Further, the processing machine 1 measures also the amount of deviation of the position of the touch sensor 33. Further, the processing machine 1 corrects the control of processing the workpiece 103 by the tool 101 based on the measured amounts of deviation.

The structure of the processing machine 1 may be for example a known structure or one applying a known structure except for components for measuring the amount of deviation of the position of the tool 101 and/or amount of deviation of the position of the touch sensor 33 (for example, the reference workpiece 105, reference gauge 35, and imaging part 37). Further, the control of the processing machine 1 may be for example a known control or one applying a known control except for the processing relating to information of the amount of deviation.

Below, first, in the processing machine 1, the overall configuration of the processing machine 1 will be illustrated except for the touch sensor 33 and the other components relating to measurement of the amount of deviation. Next, the touch sensor 33 and the other components relating to the measurement of deviation will be illustrated. Next, the configuration relating to the control system in the processing machine 1 will be illustrated. After that, procedures of correcting the control of processing based on the measured amounts of deviation will be illustrated.

(Overall Configuration of Processing Machine)

The technique according to the present disclosure can be applied to various processing machines. The illustrated processing machine 1 is just one example. In the following explanation, however, for convenience, sometimes the explanation will be given predicated on the configuration of the processing machine 1.

The processing machine 1, as already explained, performs processing of a workpiece 103 by a tool 101. The type of processing (from another viewpoint, type of the tool) may be a suitable one. For example, the type of processing is cutting, grinding, or polishing. In the example shown, the tool 101 is configured by an end mill or another rotating tool and is rotated about an axis parallel to the Z-axis. Further, the tool 101 and the workpiece 103 can relatively move in each of the X-axis, Y-axis, and Z-axis. Further, cutting, grinding, or polishing of the workpiece 103 is carried out by the tool 101 which is rotating being made to contact the workpiece 103.

The processing machine 1, for example, has a machine body 3 which holds the tool 101 and workpiece 103 and a control unit 5 which controls the machine body 3.

The machine body 3, for example, makes the tool 101 rotate as explained above and makes the tool 101 and the workpiece 103 relatively move in three axial directions. The configuration which realizes such rotation and relative movement may be made, for example, the same as various known configurations or one applying the known configurations. In the example shown, this is as follows.

The machine body 3 has a base 7, two columns 9 which are supported upon the base 7, cross rails 11 which bridge the two columns 9, a saddle 13 supported upon the cross rails 11, a Y-axis bed 15 fixed to the saddle 13, a spindle head 17 supported by the Y-axis bed 15, and a spindle 19 supported by the spindle head 17.

The tool 101 is held by the spindle 19. The spindle 19 is supported rotatably about a shaft parallel to the Z-axis by the spindle head 17 and is driven to rotate by a spindle motor 18 in a spindle head 17. Due to this, the tool 101 rotates. The spindle head 17 is able to linearly move in the Z-direction with respect to the Y-axis bed 15 (saddle 13). Due to this, the tool 101 is driven in the Z-direction. The saddle 13 is able to linearly move in the Y-direction with respect to the cross rails 11. Due to this, the tool 101 is driven in the Y-direction.

Further, the machine body 3 has an X-axis bed 21 supported by the base 7 and a table 23 supported upon the X-axis bed 21.

The workpiece 103 is held upon the table 23. The table 23 is able to linearly move in the X-direction with respect to the X-axis bed 21X. Due to this, the workpiece 103 is driven in the X-direction.

The configuration of the mechanism for realizing movement of the saddle 13, movement of the spindle head 17, movement of the table 23, and rotation of the spindle 19 may be a known configuration or one applying a known configuration. For example, the drive source may be an electric motor, hydraulic equipment, or pneumatic equipment. Further, the electric motor may be a rotary motor or linear motor. A linear guide which guides the saddle 13, spindle head 17, or table 23 (from another viewpoint, restricts movement in a direction other than the driving direction) may be a sliding guide by which a movable part and a fixed part slide, may be a rolling guide by which a rolling body rotates between the movable part and the fixed part, may be a static pressure guide by which air or oil is interposed between the movable part and the fixed part, or may be a combination of two or more among them. In the same way, the bearing of the spindle 19 may be a sliding bearing, rolling bearing, static pressure bearing, or combination of two or more among them.

The control unit 5, for example, although not particularly shown, is configured including a computer and driver (for example, servo driver). The computer may configure an NC (numerical control) device. The computer, for example, although not particularly shown, is configured including a CPU (central processing unit), ROM (read only memory), RAM (random access memory), and external storage device. By the CPU running a program stored in the ROM and/or external storage device, various types of function parts performing control etc. are constructed. The control unit 5 may include a logical circuit which performs only certain operations as well.

The control unit 5, for example, controls the rotation speed of the spindle 19 and controls the positions and speeds of the saddle 13, spindle head 17, and table 23. The position control may be so-called full closed loop control. That is, the detection positions of the saddle 13, spindle head 17, and table 23 may be fed back. However, the position control may be made semi-closed loop control where the rotation position of the electric motor is fed back or may be made open loop control without feedback. For the speed control as well, in the same way, full closed loop control, semi-closed loop control, or open loop control may be carried out.

In a case where full closed feedback control is carried out as described above, the configurations of the sensors which detect the positions and/or speeds of the members (13, 17, and 23) of the final control targets may be known configurations or ones applying known configurations. For example, the sensors may be linear encoders or laser length measuring devices. Further, in a case where semi-closed loop control is carried out, the sensor which detects the rotation position and/or rotation speed of the electric motor may be a known configuration or one applying a known configuration. For example, the sensor may be an encoder or resolver.

The processing precision of the processing machine 1 may be suitably set. For example, the processing machine 1 may be one capable of realizing processing by a precision of a submicrometer order (error less than 1 μm) or precision of a nanometer order (error less than 10 nm). Such a machine tool has already put into a practical use by the assignee of the present application (for example, UVM Series, ULG Series, and ULC Series). In more detail, for example, the positioning precision in the Y-direction of the saddle 13, positioning precision in the Z-direction of the spindle head 17, and/or positioning precision in the X-direction of the table 23 may be made 1 μm or less, 0.1 μm or less, 10 nm or less, or 1 nm or less. Naturally, the processing precision of the processing machine 1 may be lower than those described above as well.

(Movement Mechanism)

As already explained, the configuration for moving the saddle 13, spindle head 17, and table 23 on straight lines may be a suitable configuration. One example will be shown below.

Figure 2B:
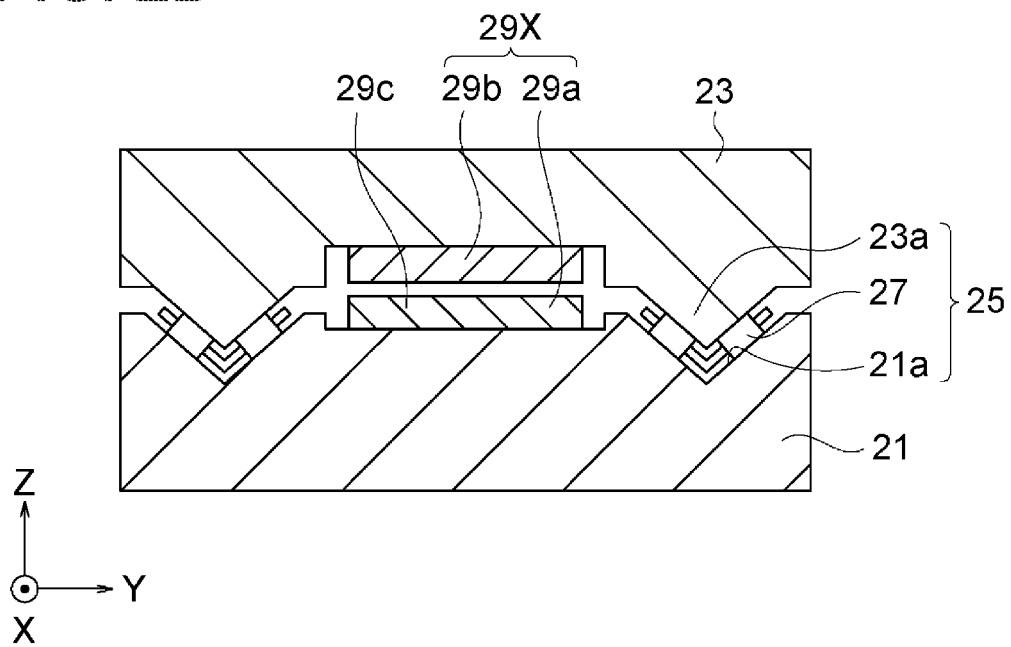
FIG. 2B is a cross-sectional view taken along the II-II line in FIG. 2A.

FIG. 2A is a perspective view showing an example of the configuration for linearly moving the table 23. FIG. 2B is a cross-sectional view taken along the II-II line in FIG. 2A.

In the example shown, a guide 25 which guides the table 23 is configured by a V-V rolling guide. For example, the guide 25 has two grooves 21a having V-shaped cross-sections which are formed in the upper surface of the X-axis bed 21 supporting the table 23, two projected rims 23a having triangular cross-sections which are formed on the lower surface of the table 23, and a plurality of rollers 27 (rolling bodies) which are interposed between the grooves 21a and the projected rims 23a. The grooves 21a and the projected rims 23a linearly extend in the X-direction. The projected rims 23a fit in the grooves 21a through the rollers 27. Due to this, the table 23 is restricted in movement in the Y-direction. Further, the rollers 27 roll on the inner surface of the grooves 21a and the outer surface of the projected rims 23a and thereby permit the relative movements of the two in the X-direction. Due to this, the table 23 moves in the X-direction with a relatively small resistance. The movement of the table 23 toward the +Z side is, for example, restricted due to the self-weight. The movement of the table 23 toward the −Z side is, for example, restricted by the reaction force from the X-axis bed 21.

Further, in the example shown, the X-axis drive source 29X which drives the table 23 is configured by a linear motor. For example, the X-axis drive source 29X has a magnet row 29a formed by a plurality of magnets 29c which are arranged in the X-direction on the upper surface of the X-axis bed 21 and a coil 29b which is fixed to the lower surface of the table 23 and faces the magnet row 29a. Further, by supply of AC power to the coil 29b, the magnet row 29a and the coil 29b generate a driving force in the X-direction. In turn, the table 23 moves in the X-direction.

The configuration for making the table 23 linearly move in the X-direction (in other words, the configuration for making the tool 101 and the workpiece 103 relatively move in the X-direction) was explained above. The above explanation may be cited for the configuration for making the saddle 13 linearly move in the Y-direction (in other words, the configuration for making the tool 101 and the workpiece 103 relatively move in the Y-direction) and the configuration for making the spindle head 17 linearly move in the Z-direction (in other words, the configuration for making the tool 101 and the workpiece 103 relatively move in the Z-direction). For example, the guides which guide the saddle 13 and spindle head 17 may be V-V rolling guides. Separation of the projected rims (23a) from the grooves (21a) may be suitably restricted by provision of engagement members and the like. Further, the Y-axis drive source 29Y (FIG. 4) which drives the saddle 13 and the Z-axis drive source 29Z (FIG. 4) which drives the spindle head 17 may be configured by linear motors. Note that, in the following explanation, sometimes the X-axis drive source 29X, Y-axis drive source 29Y, and Z-axis drive source 29Z will be referred to as the "drive sources 29" without differentiation.

(Sensors)

As already explained, the sensors which detect the positions of the saddle 13, spindle head 17, and table 23 may be given suitable configurations. FIG. 2A becomes a view showing a linear encoder as one example of the same. Specifically, this is as follows.

The processing machine 1 has an X-axis sensor 31X which detects the position in the X-direction of the table 23. The X-axis sensor 31X, for example, has a scale part 31a extending in the X-direction and a detection part 31b facing the scale part 31a. In the scale part 31a, for example, a plurality of optically or magnetically formed patterns are arranged in the X-direction at a constant pitch. The detection part 31*b* generates signals in accordance with relative positions relative to the patterns. Accordingly, displacement (position) can be detected by counting the signal generated along with the relative movements of the scale part 31*a* and the detection part 31*b* (that is, counting the patterns).

One of the scale part 31*a* and the detection part 31*b* (scale part 31*a* in the example shown) is fixed to the table 23. The other of the scale part 31*a* and the detection part 31*b* (detection part 31*b* in the example shown) is directly or indirectly fixed with respect to the X-axis bed 21. Accordingly, when the table 23 moves, the scale part 31*a* and the detection part 31*b* relatively move. Due to this, the displacement (position) of the table 23 is detected.

The specific attachment positions of the scale part 31*a* and the detection part 31*b* may be suitably set. Further, the X-axis sensor 31X may be an absolute type capable of identifying the position (absolute position) of the detection part 31*b* relative to the scale part 31*a* based on the patterns of the scale part 31*a* or may be an incremental type unable to perform such identification. As is well known, even an incremental type scale can identify the absolute position by moving the detection part 31*b* to a predetermined position (for example, the movement limit) relative to the scale part 31*a* and performing calibration.

The X-axis sensor 31X which detects the position in the X-direction of the table 23 was explained. The above explanation may be cited for the Y-axis sensor 31Y (FIG. 4) which detects the position in the Y-direction of the saddle 13 and for the Z-axis sensor 31Z (FIG. 4) which detects the position in the Z-direction of the spindle head 17. Note that, in the following explanation, sometimes the X-axis sensor 31X, Y-axis sensor 31Y, and Z-axis sensor 31Z will not be differentiated and will be referred to the "sensors 31".

The X-axis sensor 31X detects the position (absolute position) of the table 23 in the X-direction. However, the X-axis sensor 31X may be grasped as detecting the relative positions of the workpiece 103 (or table 23) and the tool 101 (or spindle 19 or spindle head 17) in the X-direction. In the same way, the Y-axis sensor 31Y may be grasped as detecting the relative positions of the workpiece 103 and the tool 101 in the Y-direction. The Z-axis sensor 31Z may be grasped as detecting the relative positions of the workpiece 103 and the tool 101 in the Z-direction.

(Configuration of Touch Sensor)

Figure 3:
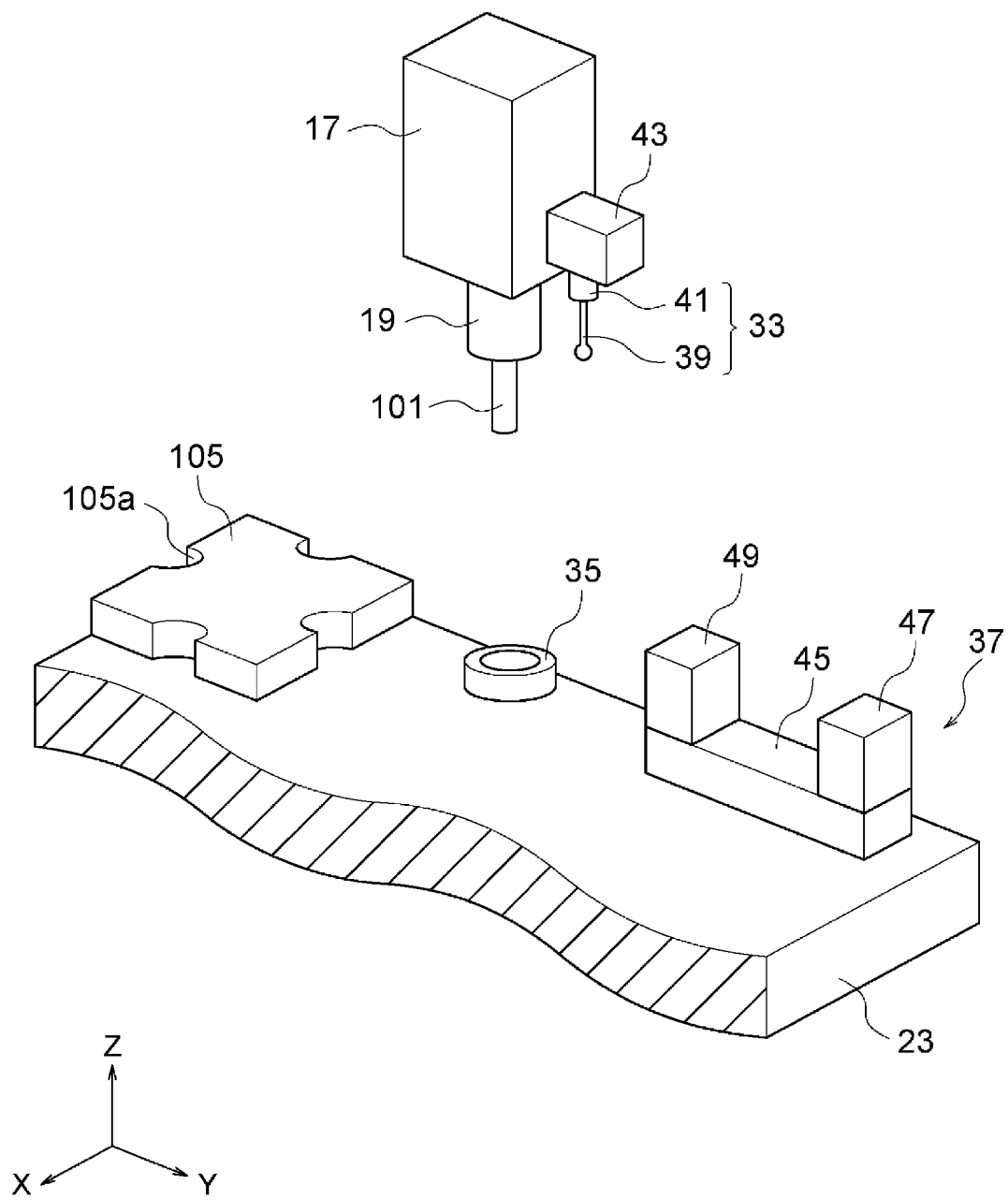
FIG. 3 is a perspective view showing part of FIG. 1 enlarged.

FIG. 3 is a view showing part of FIG. 1 enlarged.

The touch sensor 33, for example, detects contact of the touch sensor 33 against a predetermined target (for example workpiece 103 or later explained reference workpiece 105). The configuration of the touch sensor 33 may be made a known one or one applying a known one. Below, an example of the configuration of the touch sensor 33 will be explained. Note that, in the following explanation, for convenience, sometimes contact against the workpiece 103 will be taken as an example.

The touch sensor 33 for example has a stylus 39 which contacts the workpiece 103 and a sensor body 41 holding the stylus 39. The stylus 39 for example has a substantially rod shape. The front end thereof may be given a diameter larger than the other portions by formation in a spherical shape and the like. The sensor body 41, for example, outputs a touch signal to the control unit 5 when the stylus 39 comes into contact with the workpiece 103.

The principle of detection of touch by the touch sensor 33 may be a suitable one. As the detection principle, for example, there can be mentioned the principle of the stylus 39 moving with respect to the sensor body 41 due to a force received from the workpiece 103 and consequently a movable contact and a fixed contact coming into contact. Further, for example, there can be mentioned a principle of the movement of the stylus 39 described above being detected by an optical sensor. Further, for example, there can be mentioned a principle of the force received by the stylus 39 from the workpiece 103 being detected by a pressure sensor. Further, for example, there can be mentioned a principle of a closed circuit including the workpiece 103 and stylus 39 being configured by contact of the stylus 39 with the workpiece 103 having conductivity.

In the illustrated mode of attachment, the touch sensor 33 is fixed with respect to the member (spindle head 17 in the present embodiment) which movably holds the spindle 19 at a position separated from the spindle 19. The touch sensor holding part 43 holding the touch sensor 33 for example may hold the touch sensor 33 so as to be immovable with respect to the spindle head 17. However, the touch sensor holding part 43 may hold the touch sensor 33 so as to be movable between the position where the touch sensor 33 is not used and the position at the time when the touch sensor 33 is used (for example a position closer to the −Z side than the former position) as well.

The touch sensor 33 is able to move together with the spindle 19. Accordingly, the touch sensor 33, in the same way as the tool 101, is able to relatively move with respect to the table 23 (from another viewpoint, workpiece 103). Further, this relative movement is detected by the sensor 31.

Note that, although not particularly shown, the touch sensor 33 may be held by the spindle 19 in place of the tool 101. Also in this case, in the same way as the example shown, it can be said that the touch sensor 33 is arranged at a position having a certain positional relationship with the position at which the tool 101 is arranged. Note that, in the example shown, the above certain positional relationship is a relationship where the two positions are separated in a predetermined direction by a predetermined distance. In a mode where the touch sensor 33 is held by the spindle 19 in place of the tool 101, the above certain positional relationship is a relationship where the two positions become the same position.

The processing machine 1 (control unit 5) for example controls the drive sources 29 of the three axes so as to make the touch sensor 33 and the workpiece 103 relatively move in at least one direction among the three directions (X-, Y-, and Z-directions). Further, when contact against the workpiece 103 is detected by the touch sensor 33, the processing machine 1 stops the relative movement and acquires the detection value of the sensor 31 in at least one direction described above at that time.

The processing machine 1 for example stores in advance the information (touch sensor position information D4 in FIG. 6) of correspondence between the position of the touch sensor 33 and the detection value of the sensor 31 (from another viewpoint, coordinates in the machine coordinate system with which the detection value of the sensor 31 is linked). Accordingly, using this touch sensor position information D4 and the detection value of the sensor 31 acquired according to the above operation, in at least one direction described above, the correspondence between the position of the workpiece 103 and the detection value of the sensor 31 in at least one direction described above (from another viewpoint, the position of the workpiece 103 in the machine coordinate system) is identified. Further, for example, by performing the above operation also in the other directions, the position of the workpiece 103 is identified in all directions. Further, for example, by performing the above operation in various directions and at various positions, the detailed shape of the workpiece 103 is identified.
(Mode of Utilization of Touch Sensor)

The touch sensor 33 may just be used for identification of the amount of deviation of the tool 101 using the later explained reference workpiece 105. In other words, it may just be used for measurement of the shape of the reference workpiece 105 (from another viewpoint, position of a predetermined part in the reference workpiece 105). Further, the touch sensor 33, in addition to the measurement of the shape of the reference workpiece 105, may also be used for measurement of the shape (position) of the workpiece 103.

In the explanation of the present embodiment, a mode where the touch sensor 33, in addition to the measurement of the shape of the reference workpiece 105, is used also for the measurement of the shape of the workpiece 103, will be taken as an example. Further, in the following explanation, sometimes the explanation will be given predicated on this mode.

The operation of the processing machine 1 when measuring the position of the workpiece 103 by the touch sensor 33 may be a known operation or one applying a known operation. For example, this is as follows.

The processing machine 1 (control unit 5) holds (stores) the information of the machine coordinate system defined in a fixed manner with respect to an immovable portion (for example the base 7) in the processing machine 1. The machine coordinate system, from another viewpoint, is an absolute coordinate system. Further, it is linked with the detection value of the sensor 31. The NC program 107 for example designates the position (coordinates) and amount of movement of the tool 101 by numerical values according to this machine coordinate system. The processing machine 1 performs feedback control based on the detection value of the sensor 31 so that the position and amount of movement designated according to the NC program are realized. At this time, in the NC program, for example, it is supposed that the workpiece 103 is positioned at predetermined coordinates in the machine coordinate system. Accordingly, if the position of the workpiece 103 deviates from the supposed position, the processing precision falls.

Therefore, the processing machine 1 measures the position of the workpiece 103 by using the touch sensor 33. As already explained, this position is obtained as the detection value of the sensor 31 (from another viewpoint, coordinates in the machine coordinate system). Further, the processing machine 1 corrects the control of the drive source 29 based on an NC program based on the position of the workpiece 103 measured by using the touch sensor 33. For example, the machine coordinate system held by the processing machine 1 is shifted so that the actual position of the workpiece 103 which is measured and the coordinates of the workpiece 103 supposed in the NC program coincide. Conversely, various coordinates designated by the NC program may be shifted as well. Due to this, the processing precision is improved.

Note that, in the above explanation, sometimes the operation utilizing the touch sensor 33 was explained by the concept of correction based on the measured position of the workpiece 103. However, the above operation may also be grasped as an operation where origins of the coordinate system of coordinates designated by the NC program or the machine coordinate system of the processing machine 1 are defined by the detected position of the workpiece 103. Accordingly, in the following explanation, sometimes the term "correction" and the term "setting of origins" will be mixed.

(Reference Workpiece, Reference Gauge, and Summary of Imaging Part)

As explained in the explanation of the mode of utilization of the touch sensor 33 given above, the processing machine 1 for example holds the information of the machine coordinate system with which the detection value of the sensor 31 is linked. Further, based on the detection value of the sensor 31, the processing machine 1 moves the tool 101 to the coordinates designated by the NC program. Due to this, the workpiece 103 is processed to a desired shape by the tool 101.

The above operation is predicated on the position of the tool 101 and the detection value of the sensor 31 have a certain correspondence. Accordingly, if the correspondence between the position of the tool and the detection value of the sensor 31 deviates from the above certain correspondence due to a temperature change of the processing machine or the like, the processing precision of the processing machine 1 falls. Therefore, the processing machine 1 detects this amount of deviation and corrects the control of processing the workpiece 103 by the tool 101 based on the detected amount of deviation. The amount of deviation of the tool 101 was explained, but the same can be said for the touch sensor 33 as well.

Note that, in the following explanation, for convenience, sometimes the position of the tool 101 at the time when the correspondence between the position of the tool 101 and the detection value of the sensor 31 is a certain correspondence which is supposed in the NC program and/or processing machine 1 will be referred to as a "first reference position". At this time, the amount of deviation of the correspondence between the position of the tool 101 and the detection value of the sensor 31 from the above certain correspondence means the same as the amount of deviation of the position of the tool 101 from the first reference position. However, depending on the method of measurement of the amount of deviation, the amount of deviation from the certain correspondence and/or amount of deviation of the position of the tool 101 which is measured sometimes includes other amounts of deviation.

In the same way, sometimes the position of the touch sensor 33 at the time when the correspondence between the position of the touch sensor 33 and the detection value of the sensor 31 is a certain correspondence which is supposed in the NC program and/or processing machine 1 will be referred to as a "second reference position". At this time, the amount of deviation of the correspondence between the position of the touch sensor 33 and the detection value of the sensor 31 from the above certain correspondence has the same meaning as the amount of deviation of the position of the touch sensor 33 from the second reference position. However, depending on the method of measurement of the amount of deviation, sometimes the amount of deviation from the above certain correspondence and/or amount of deviation of the position of the touch sensor 33 which is measured includes other amounts of deviation.

The first and second reference positions may be set to be any positions. For example, the first and second reference positions may be made the positions at the time when deformation due to a temperature change etc. does not occur in the processing machine 1. However, it is also possible to make the first and second reference positions the positions at the time when deformation due to a temperature change etc. occurs in the processing machine 1. In other words, the certain positional relationship supposed in the NC program and/or processing machine 1 may be the relationship at the time when no deformation of the processing machine 1 due to temperature change or the like occurs or may be the relationship when it occurs. It may be set to either.

The processing machine 1, for measurement of the amount of deviation, for example, has a reference workpiece 105, reference gauge 35, and imaging part 37. Note that, as will be understood from the explanation which will be given later, the reference workpiece 105 is a consumable item. Accordingly, the reference workpiece 105, in the same way as the workpiece 103, may be grasped as a member which is not a component of the processing machine 1 itself as well.

The reference workpiece 105 is for measuring the amount of deviation of the position of the tool 101 from the above first reference position. The reference gauge 35 is for measuring the amount of deviation of the position of the touch sensor 33 from the above second reference position. The imaging part 37 is for measuring the amount of deviation of the position of the tool 101 from the first reference position and/or the amount of deviation of the position of the touch sensor 33 from the above second reference position. Further, the imaging part 37 contributes to for example measurement of the amount of deviation of the tool 101 in a direction different from the direction of the amount of deviation which is identified by utilizing the reference workpiece 105 and/or measurement of the amount of deviation of the touch sensor 33 in a direction different from the direction of the amount of deviation which is identified by utilizing the reference gauge 35.

(Method of Utilization of Reference Workpiece)

The method of utilization of the reference workpiece 105 is for example as follows.

The reference workpiece 105 is for example held upon the table 23 to be unable to move with respect to the workpiece 103. Accordingly, the reference workpiece 105 is able to be processed by the tool 101 in the same way as the workpiece 103.

The processing machine 1 processes the reference workpiece 105 by the tool 101 based on the detection value of the sensor 31 so that its shape becomes the predetermined target shape. From another viewpoint, the processing machine 1 processes the reference workpiece 105 so that a predetermined part in the reference workpiece 105 (for example a part on the outer edge of the reference workpiece 105) is positioned at the predetermined target position. This target position (target shape) is for example designated by coordinates of the machine coordinate system (from another viewpoint, detection value of the sensor 31) in a program the same as the NC program for processing the workpiece 103.

Next, the processing machine 1 measures the actual shape of the reference workpiece 105 by the touch sensor 33. From another viewpoint, the processing machine 1 measures the actual position of a predetermined part in the reference workpiece 105. This method of measurement, basically, is the same as the method of measurement of the position (from another viewpoint, shape) of the workpiece 103 which was explained above. That is, the processing machine 1 acquires the detection value of the sensor 31 (from another viewpoint, coordinates in the machine coordinate system) at the time when contact against the reference workpiece 105 is detected by the touch sensor 33.

Next, the processing machine 1 identifies the amount of deviation of the position of the tool 101 based on a difference between the target shape (target position of the predetermined part) and the measured shape (measured position of the predetermined part). Note that, the difference itself may be made the amount of deviation or the difference to which some sort of correction has been applied may be made the amount of deviation. At the time of correction with respect to the difference, for example, a difference of processing conditions between the processing of the workpiece 103 and the processing of the reference workpiece 105 may be considered.

After that, the processing machine 1 corrects the control of the drive source 29 at the time when the workpiece 103 is processed by the tool 101 based on the measured amount of deviation of the position of the tool 101. For example, it shifts the coordinate system of the NC program or shifts the machine coordinate system of the processing machine 1 (from another viewpoint, sets the origin in the coordinate system) by the measured amount of deviation. The amount of deviation of the tool 101 is measured and the amount used in this way Note that, as will be understood from the above description, in measurement using the touch sensor 33 and sensor 31, the measurement of the shape of the reference workpiece 105 (or workpiece 103) and the measurement of the position of the predetermined part in the reference workpiece 105 can be deemed to be the same. Further, the position of the reference workpiece 105 when calculating the amount of deviation may be made not the position of the part against which the touch sensor 33 contacts, but a position (for example center point) representing the positions of the plurality of parts against which the touch sensor 33 contacts. Accordingly, in the explanation of the present disclosure, concerning the measurement of the amount of deviation, the term "shape of the reference workpiece 105" and the term "position of the reference workpiece 105" may be grasped to be the same unless a contradiction arises.

The measurement of the amount of deviation utilizing the reference workpiece 105 may be carried out in any direction in the orthogonal coordinate system XYZ. For example, the measurement may be carried out for only one direction, only two directions, or all of the three directions among the directions of the three axes of X, Y, and Z. Further, the measurement may be carried out in a direction inclined with respect to the three axes of X, Y, and Z as well. However, for example, measurement in a direction along the XY plane and is inclined with respect to the X-axis and Y-axis may be grasped as measurement of the amount of deviation in the X-direction (X-direction component in the amount of deviation) and measurement of the amount of deviation in the Y-direction (Y-direction component in the amount of deviation) being carried out as well.

In the present embodiment, mainly a mode where the amount of deviation of the position of the tool 101 is measured for the two directions of the X-direction and Y-direction by utilizing the reference workpiece 105 will be taken as an example. That is, the processing from the X-direction and the processing from the Y-direction are carried out by the tool 101, and the position in the X-direction of the part processed from the X-direction and the position in the Y-direction of the part processed from the Y-direction are measured by the touch sensor 33. In the following explanation, sometimes the explanation will be made predicated on a mode where measurement is carried out in two directions in this way.

When measuring the amount of deviation of the tool 101 in one direction, the processing of the reference workpiece 105 may be carried out from only one side in the above one direction or may be carried out from both of the one side and the other side in the one direction (see later explained FIG. 7A and FIG. 8B). In the latter case, for example, the position of each of the part processed from one side and the part processed from the other side is measured by the touch sensor 33. Further, the position (representative position) of the reference workpiece 105 may be identified based on the two positions. For example, in the one direction, the midway (center, middle point) of the two positions may be made the position of the reference workpiece 105. Naturally, one position of the part with which the touch sensor 33 contacts may be defined as the position of the reference workpiece 105 as well.

One reference workpiece 105 may be utilized for just processing one workpiece 103 or may be utilized for processing a plurality of workpieces 103. From another viewpoint, the reference workpiece 105 may be exchanged or not exchanged along with the exchange of the workpieces 103. In the latter case, the processing and measurement of one reference workpiece 105 are repeated over processing of a plurality of workpieces 103.

Further, one reference workpiece 105 may be utilized for just processing by one tool 101 or may be utilized for processing by a plurality of tools 101. From another viewpoint, the reference workpiece 105 may be exchanged or not exchanged along with the exchange of the tools 101. In the latter case, one reference workpiece 105 is repeatedly processed by a plurality of tools 101, and the measurement is carried out on each occasion.

In a case where the plurality of processing steps are carried out in order by one tool 101, the measurement of the amount of deviation utilizing one reference workpiece 105 may be carried out just one time (for example immediately before the first machining process) or may be carried out two or more times (before each of any two or more processing steps). In the latter case, one reference workpiece 105 is for example utilized for the above two or more times of measurement of the amount of deviation. From another viewpoint, one reference workpiece 105 is not exchanged for each processing step. However, it is not impossible to exchange the reference workpieces 105 for each processing step.

(Configuration of Reference Workpiece)

The shape, dimensions, and material of the reference workpiece 105 utilized as described above may be suitable ones. Note that, FIG. 3 shows the shape of the reference workpiece 105 before processing (and/or after processing for the first measurement being carried out).

For example, the shape of the reference workpiece 105 may be a plate shape (example shown) or may be a shape which cannot be thought of as a plate shape. Further, the shape of the reference workpiece 105, when viewed in a predetermined direction (for example the Z-direction, direction perpendicular to the direction in which the amount of deviation is measured), may be substantially polygonal (for example rectangular) or may be circular or elliptical. In other words, when viewed in a predetermined direction, the entirety or at least a half of the outer edge of the reference workpiece 105 may be configured by a straight line or may be configured by a curved line. Further, the shapes of the reference workpiece 105 may be similar before the processing and after the processing or may not be similar. Further, when viewed in a predetermined direction (explained above), a curvature (0 in the case of the straight line) of the part to be processed may be maintained or may not be maintained before and after the processing.

In the example shown, the shape of the reference workpiece 105 becomes a substantially plate shape. The plate shape is for example such a shape with a length in one direction (Z-direction in the example shown, direction perpendicular to the measurement direction) shorter than the lengths in the two directions (X-direction and Y-direction) perpendicular to the one direction. Further, in the example shown, when viewed in the above one direction (when viewed on a plane of the plate), the shape of the reference workpiece 105 (before processing and/or after the first processing) become a shape with a recessed portion 105a (notch) formed in each of the four sides of the rectangle. The shapes and sizes of the recessed portions 105a may be suitably set.

Further, for example, the size of the reference workpiece 105 may be smaller than the size of the workpiece 103 (example shown in FIG. 1), may be equal to it, or may be larger than it. The relationship of sizes of the two may change along with the processing of the reference workpiece 105 and/or workpiece 103. Further, for example, the thickness (length in the Z-direction) of the reference workpiece 105 may be shorter (example shown) than, may be equal to, or may be longer than the length of the tool 101 or the length in the Z-direction which is able to be processed by the tool 101 when the tool 101 is not moved in the Z-direction.

The material of the reference workpiece 105 may be the same as or may be different from the material of the workpiece 103. In the latter case, the material of the reference workpiece 105 may be one having a small load of processing (for example a material having a low hardness) or may be one having a large load of processing compared with the material of the workpiece 103. Further, the thermal expansion coefficient (for example linear expansion coefficient) of the material of the reference workpiece 105 may be smaller than the thermal expansion coefficient of the material of the workpiece 103, may be equal to it, or may be larger than it. Further, the material of the reference workpiece 105 may be made for example a metal, wood, plastic, glass, or ceramic.

(Method of Utilization of Reference Gauge)

The method of utilization of the reference gauge 35 is for example as follows.

The reference gauge 35 is for example held upon the table 23 to be unable to move with respect to the workpiece 103. Accordingly, the reference gauge 35, in the same way as the workpiece 103, is able to relatively move with respect to the touch sensor 33.

The processing machine 1 measures the position of the reference gauge 35 by the touch sensor 33. The method of this measurement is basically the same as the method of measurement of the position of the workpiece 103 explained above. That is, the processing machine 1 acquires the detection value of the sensor 31 (from another viewpoint, coordinates in the machine coordinate system) at the time when contact against the reference gauge 35 is detected by the touch sensor 33.

On the other hand, the processing machine 1 holds the information of the position of the reference gauge 35 (reference gauge information D3 in FIG. 6) to be measured by the touch sensor 33 when the position of the touch sensor 33 is at the second reference position explained above (where there is no deviation in the position of the touch sensor 33). This reference gauge information D3 may be for example acquired by the position of the reference gauge 35 being measured by the touch sensor 33 at a predetermined reference timing. The reference timing is the timing at which the touch sensor 33 may be deemed to be located at the second reference position. For example, the reference timing may be made a timing at which an amount of deformation of the processing machine 1 due to a temperature change or the like is relatively small. In more detail, it may be before the start of the processing by the processing machine 1.

Further, the processing machine 1 identifies the amount of deviation of the touch sensor 33 based on the difference between the position indicated by the reference gauge information D3 and the position of the reference gauge 35 measured by the touch sensor 33. Note that, the difference itself may be defined as the amount of deviation or the difference to which a certain correction is applied may be defined as the amount of deviation.

After that, the processing machine 1 corrects the control of the drive source 29 when the workpiece 103 is processed by the tool 101, based on the measured amount of deviation of the position of the touch sensor 33. For example, the touch sensor position information D4 explained above (information of the correspondence between the position of the touch sensor 33 and the detection value of the sensor 31) is corrected using the measured amount of deviation. This correction, from another viewpoint, is correction of various measurements (for example measurement of the position of the workpiece 103 by the touch sensor 33 and measurement of the amount of deviation of the position of the tool 101 by the reference workpiece 105) based on the touch sensor position information D4. Further, it is the correction of the control of processing based on results of the measurements.

The measurement of the amount of deviation utilizing the reference gauge 35 may be carried out in any direction in the orthogonal coordinate system XYZ. For example, the measurement may be carried out for only one direction, for two directions, or for all of the three directions among the directions of the three axes of X, Y, and Z. Further, the measurement may be carried out in a direction inclined with respect to the three axes of X, Y, and Z as well. Further, for example, the measurement utilizing the reference gauge 35 may be carried out only in the directions (X-direction and Y-direction in the present embodiment) in which measurement utilizing the reference workpiece 105 is carried out. Otherwise, in addition to these directions, it may be carried out in the other direction (Z-direction) as well.

In the present embodiment, mainly, a mode where the amount of deviation of the position of the touch sensor 33 is measured by utilizing the reference gauge 35 for the the two directions of the X-direction and Y-direction (from another viewpoint, two directions in which the measurement utilizing the reference workpiece 105 is carried out) will be taken as an example. In the following explanation, sometimes the explanation will be given predicated on this mode.
(Configuration of Reference Gauge)

The shape, dimensions, and material of the reference gauge 35 utilized as described above may be made suitable ones.

In the example shown, the shape of the reference gauge 35 is a ring shape opening in the Z-direction. The shape of the inner circumferential surface (inner edge) of the reference gauge 35 when viewed in the Z-direction is circular. Further, the touch sensor 33 detects the position of the reference gauge 35 by contact against the inner circumferential surface of the reference gauge 35. At this time, for example, the touch sensor 33 may be made to contact the two sides in each of two or more directions to measure a plurality of positions on the inner circumferential surface of the reference gauge 35. Further, the position of the center of the reference gauge 35 may be found based on these plurality of positions, and the position of the center may be defined as the measurement position of the reference gauge 35. In this case, naturally, the information of the position of the reference gauge 35 (reference gauge information D3) which is acquired in advance is also information showing the position of the center of the reference gauge 35 so that it can be compared with the measurement position.

Unlike the example shown, the reference gauge 35 may have a shape where the touch sensor 33 contacts the outer circumferential surface (outer edge) as well. Further, in the reference gauge 35, when viewed in the Z-direction, the surface which the touch sensor 33 contacts may be recessed (example shown), may be convex, may be curved (example shown), or may be straight. The shape of the reference gauge 35 when viewed on a plane is not limited to a circular one. It may be a rectangle or other polygonal shape, may be a shape having a curve other than circle, or may be a shape like a cross having a projecting portion on the outer periphery.

Further, the size of the reference gauge 35 may be smaller than, may be equal to, or may be larger than the size of the workpiece 103 and/or reference workpiece 105. The material of the reference gauge 35 may be the same as or may be different from the material of the workpiece 103 and/or material of the reference workpiece 105. The thermal expansion coefficient (for example linear expansion coefficient) of the material of the reference gauge 35 may be smaller than, may be equal to, or may be larger than the thermal expansion coefficient of the material of the workpiece 103 and/or thermal expansion coefficient of the material of the reference workpiece 105. Further, the material of the reference gauge 35 may be made for example a ceramic, glass, metal, wood, or plastic.
(Method of Utilization of Imaging Part)

The method of utilization of the imaging part 37 is for example as follows.

The imaging part 37 is held upon the table 23 so as to be unable to move with respect to the workpiece 103. Accordingly, the imaging part 37 is relatively movable with respect to the tool 101 in the same way as the workpiece 103.

The processing machine 1 performs positioning of the tool 101 and the imaging part 37 with predetermined position relationships based on the detection value of the sensor 31 and captures the tool 101 by the imaging part 37. The imaging is for example carried out at the reference timing and one or more measurement timings after that. The reference timing is the timing at which the tool 101 can be deemed to be located at the first reference position already explained. The measurement timing is the timing at which the amount of deviation of the tool 101 is measured.

Further, for example, by comparing the position of the tool 101 in the image captured at the reference timing and the position of the tool 101 in the image captured at the measurement timing, the amount of deviation of the position of the tool 101 in the direction perpendicular to the imaging direction (in other words, the direction along the optical axis of the imaging part 37) is identified. Note that, the position in the imaging direction of the tool 101 can also be identified based on the size etc. of the tool 101 in the image. That is, it is possible to make the measurement direction of the position of the tool 101 any direction with respect to the imaging direction. However, in the explanation of the present embodiment, a mode where the measurement direction is a direction perpendicular to the imaging direction will be taken as an example.

After that, the processing machine 1 corrects the control of the drive source 29 when the workpiece 103 is processed by the tool 101, based on the measured amount of deviation of the tool 101. For example, the coordinate system of the NC program is shifted or the machine coordinate system of the processing machine 1 is shifted (from another viewpoint, the origin of the coordinate system is set) using the measured amount of deviation.

At the time of imaging, the tool 101 may be stopped from rotating or may be rotated. Further, in a mode where the imaging is carried out in a state where the rotation of the tool 101 is stopped, the spindle 19 may or may not be positioned in the rotation direction. These conditions may be suitably set in accordance with runout and shape etc. of the tool 101.

At the time of identification of the amount of deviation, various known image processing may be carried out. For example, at the time of identification of the profile of the tool 101, known edge detection may be carried out. The precision of detection of the amount of deviation may be suitably set. For example, in the image, the position of the tool 101 may be identified in pixel units, that is, the precision of detection of the amount of deviation may be made a length corresponding to one pixel. Further, for example, by performing processing (sub-pixel processing) estimating the edge position of the tool 101 from the periphery information of the tool 101 in the image, a precision of detection of a length shorter than a length corresponding to one pixel may be realized. For example, the precision of detection of the amount of deviation may be a length corresponding to $1/1000$ pixel, $1/100$ pixel, or $1/10$ pixel.

The information of correspondence between 1 pixel and an actual length corresponding to 1 pixel may be input by a manufacturer of the processing machine 1, may be input by an operator, or may be acquired by the processing machine 1 by performing a predetermined operation. When it is acquired by the processing machine 1, for example, the processing machine 1 makes the tool 101 and the imaging part 37 relatively move in a direction perpendicular to the imaging direction by the drive source 29 and acquires images at least at two imaging positions. The correspondence between 1 pixel and the actual length is identified by comparing a distance between the two imaging positions detected by the sensor 31 at this time and the difference of positions (pixel numbers) of the tool 101 between the two images.

In the above explanation, the identification of the amount of deviation of the position of the tool 101 was explained. However, in the same way as the tool 101, the amount of deviation of the position of the touch sensor 33 can be identified in the same way as the amount of deviation of the position of the tool 101. The above explanation may be cited for the touch sensor 33 by replacing the term "tool 101" by the term "touch sensor 33" unless a contradiction arises. The amount of deviation of the touch sensor 33 is for example utilized for correction of the touch sensor position information D4.

The measurement of the amount of deviation utilizing the imaging part 37 may be carried out in any direction in the orthogonal coordinate system XYZ. For example, the measurement may be carried out for only one direction, for only two directions, or for all of the three directions among the directions of the three axes of X, Y, and Z. Further, the measurement may be carried out in a direction inclined with respect to the three axes of X, Y, and Z as well.

The measurement of the amount of deviation of the tool 101 utilizing the imaging part 37 may be carried out for example in the direction (Z-direction in the present embodiment) in which the measurement of the amount of deviation of the tool 101 utilizing the reference workpiece 105 is not carried out. In the same way, the measurement of the amount of deviation of the touch sensor 33 utilizing the imaging part 37 may be carried out in the direction (Z-direction in the present embodiment) in which the measurement of the amount of deviation of the touch sensor 33 utilizing the reference gauge 35 is not carried out. In the following explanation, sometimes the explanation will be given predicated on such a mode.

Note that, unlike the above description, the measurement of the amount of deviation of the tool 101 utilizing the imaging part 37 and the measurement of the amount of deviation of the tool 101 utilizing the reference workpiece 105 may be carried out in the same direction (may be one direction or may be two or more directions) as well. Further, the amounts of deviation in the same direction may be identified as well based on the above two types of amounts of deviation. The same is true for the measurement of the amount of deviation of the touch sensor 33 utilizing the imaging part 37 and the measurement of the amount of deviation of the touch sensor 33 utilizing the reference gauge 35.

Further, concerning the amounts of deviation in the same direction, any utilization of the imaging part 37 may differ between the tool 101 and the touch sensor 33 as well. For example, the amount of deviation of the tool 101 in the Z-direction may be measured by only the method utilizing the imaging part 37, and the amount of deviation of the touch sensor 33 in the Z-direction may be measured by only the method utilizing the reference gauge 35.

(Configuration of Imaging Part)

The configuration of the imaging part 37 may be made a known configuration or one applying a known configuration. Below, one example thereof will be explained.

The imaging part 37 for example has a support member 45, a camera 47 fixed on the support member 45, and a lighting device 49 which is fixed on the support member 45 and faces the camera 47. Further, the imaging target positioned between the lighting device 49 and the camera 47 is captured by the camera 47. The imaging target is the tool 101 or touch sensor 33. However, in the following explanation, for convenience, sometimes only the tool 101 will be referred to as the imaging target.

The direction of capturing the tool 101 (imaging direction) by the imaging part 37 (camera 47) may be any direction. In the example shown, a mode where the imaging direction is the Y-direction is illustrated. The Y-direction, in the present embodiment, is a direction perpendicular with respect to the axial direction of the tool 101 (from another viewpoint, spindle 19), a direction in which the tool 101 and the workpiece 103 can relatively move, and a direction in which the tool 101 (may be the workpiece 103 as well) is guided.

The imaging direction may be the X-direction as well. The explanation for the Y-direction given above can be applied in the same way. Further, the imaging direction may be the Z-direction as well. However, when the imaging direction is the Z-direction, in the present embodiment, it is difficult to arrange the lighting device 49 on the side opposite to the camera 47 across the tool 101. Further, the imaging direction may be a direction inclined with respect to the X-direction, Y-direction, and/or Z-direction. In this case, however, various controls and computations for measuring the position of the tool become complex.

As described above, the imaging direction may be any direction. In the explanation of the present embodiment, however, for convenience, sometimes the explanation will be made predicated on the imaging direction being the Y-direction.

The support member 45 contributes to fixation of the camera 47 and lighting device 49 with respect to the table 23. Further, it contributes to prescription of the relative positions of the camera 47 and the lighting device 49. The shape, dimensions, and material of the support member 45 may be suitably set. Further, the support member 45 may be omitted as well. That is, the camera 47 and the lighting device 49 may be directly fixed to the table 23 as well.

The camera 47, for example, although not particularly shown, has a lens, an imager, and a housing accommodating them. The camera 47 may have a driver which drives the imager and/or an image processing part which processes the data of the captured image. Such a function part may be realized by for example an IC (integrated circuit). The camera 47 acquires for example a gray scale image. However, the camera 47 may acquire a color image as well. In other words, the camera 47 may have color filters as well.

The lens of the camera 47 may be a single lens or may be a composite lens. As the material of the lens, there can be mentioned glass and plastic. The imager is for example a solid-state image sensor. As the solid-state image sensor, there can be mentioned a CCD (charge coupled device) image sensor and CMOS (complementary metal-oxide-semiconductor) image sensor. The imager is for example one having a high sensitivity with respect to visible light. However, the imager may be one having a high sensitivity with respect to infrared light, UV light, X-rays or the like.

The lighting device 49, for example, contributes to clarification of the profile of the tool 101 in the image captured by the camera 47. Specifically, the light from the lighting device 49 is blocked in part by the tool 101. The remaining part passes the periphery of the tool 101 and is incident upon the camera 47. As a result, in the image captured by the camera 47, the brightness of the region on the outside of the tool 101 becomes higher than the brightness of the region of the tool 101. In turn, the profile of the tool 101 becomes clearer.

The lighting device 49, although not particularly shown, has a light source which generates light. The light is for example visible light. However, the light may be infrared light, UV light, or X-rays etc. Further, the light may have a high directivity (for example laser beam) or does not have a high directivity. The light source may be for example an LED (light emitting diode), laser, fluorescent light, or incandescent bulb. The lighting device 49 may include a lens converging the light from the light source as well. The lighting device 49 may be omitted as well. For example, the image of the tool 101 by a light from a usual lighting device in a factory may be formed in the imager in the camera 47 as well.

(Positions of Arrangement of Reference Workpiece, Reference Gauge, and Imaging Part)

The reference workpiece 105, reference gauge 35, and imaging part 37, for example, as explained up to here, are directly or indirectly fixed with respect to the table 23. The specific positions of arrangement of these components (105, 35, and 37) with respect to the table 23 are any positions. In other words, the reference workpiece 105 may be arranged at any position at which processing by the tool 101 is possible. The reference gauge 35 may be arranged at any position at which the touch sensor 33 can contact. The imaging part 37 may be arranged at any position at which capturing of the tool 101 and/or touch sensor 33 is possible.

For example, the components (105, 35 or 37) may be positioned at the outer peripheral portion of the table 23 or may be positioned on a not shown additional table fixed to the table 23. However, the additional table may be grasped as a part of the table 23 as well. Further, each of the components may be positioned on any side on the +X side, −X side, +Y side, and −Y side among four sides of the schematically box shaped table 23. Further, one component, on one side at which the one component is positioned, may be positioned on the end part side of this one side (corner side in the table) or may be positioned at the center of one side. Two or more components may be the same as each other or may be different from each other concerning whether they are positioned on the table 23 and on which side in the table 23 they are positioned.

(Measurement Timing of Amount of Deviation)

The measurement timing of the amount of deviation of the tool 101 and the measurement timing of the amount of deviation of the touch sensor 33 (from another viewpoint, the timing at which control is corrected based on the measurement results, same is true for the following description) may be suitably set. For example, the measurement timing may be after a warming-up operation of the processing machine 1 and before processing of the workpiece 103 by the tool 101. Further, for example, in place of or addition to the above timings, the measurement timing may be made one or more timings from the start of processing by the tool 101 up to the end of processing.

The measurement timing during processing may be suitably set with respect to various processes for processing the workpiece 103. For example, the tool 101 sometimes repeats movement in a state where it contacts the workpiece 103 and movement of separation from the workpiece 103 after that. In such a case, the measurement timing may be set with respect to any one or more of the plurality of processes where the tool 101 is separated from the workpiece 103. Further, for example, even in a process in which the state of contact of the tool 101 against the workpiece 103 is inherently maintained, a process of separating the tool 101 from the workpiece 103 may be inserted at the timing of change of the movement direction of the tool 101, and the measurement timing may be set in this process.

The measurement timing may be prescribed by the NC program including a command concerning the processing of the workpiece 103 or may be prescribed by a program different from the NC program so that the measurement is automatically carried out at the time when the predetermined measurement conditions are satisfied. Further, the measurement timing need not be set in advance in that way either. For example, it is also possible to use a predetermined operation carried out by an operator with respect to a not shown operation part of the processing machine 1 as the trigger for measurement. That is, the timing at which the above predetermined operation is carried out may be defined as the measurement timing.

In the mode as described above where measurement is automatically carried out at the time when predetermined measurement conditions are satisfied, the above measurement conditions may be suitably set. For example, the measurement conditions may include a condition that the processing prescribed by the NC program proceeds and a process where the tool 101 is temporarily separated from the workpiece 103 is reached. In addition to or in place of this, the measurement conditions may include a condition that a temperature detected by a not shown temperature sensor exceeds a predetermined threshold value. Further, for example, any one or more among the plurality of processes prescribed in the NC program being designated and the advancing stage of processing reaching the above designated process may be made measurement conditions.

The measurement timing may be set by an operator or may be set by a manufacturer of the processing machine 1. For example, as explained above, a mode where the measurement timing is prescribed by the NC program and a mode where the timing at which the predetermined operation is carried out is defined as the measurement timing are examples of modes where the measurement timing is set by the operator. Further, for example, in a case where measurement is carried out at the time when predetermined measurement conditions are satisfied, the above measurement conditions may be set by the operator or may be set by the manufacturer of the processing machine 1.

The measurement timing of the amount of deviation of the tool 101 and the measurement timing of the amount of deviation of the touch sensor 33 may be the same or may be different. Note that, as apparent from the fact that the touch sensor 33 is utilized for both measurements, the "measurement timings are the same" referred to here does not mean the "same time". For example, the "measurement timings are the same" includes a mode where the measurement of the amount of deviation of the tool 101 and the measurement of the amount of deviation of the touch sensor 33 are carried out in order without the processing of the workpiece 103 being sandwiched between them.

(Configuration of Control System in Processing Machine)

Figure 4:
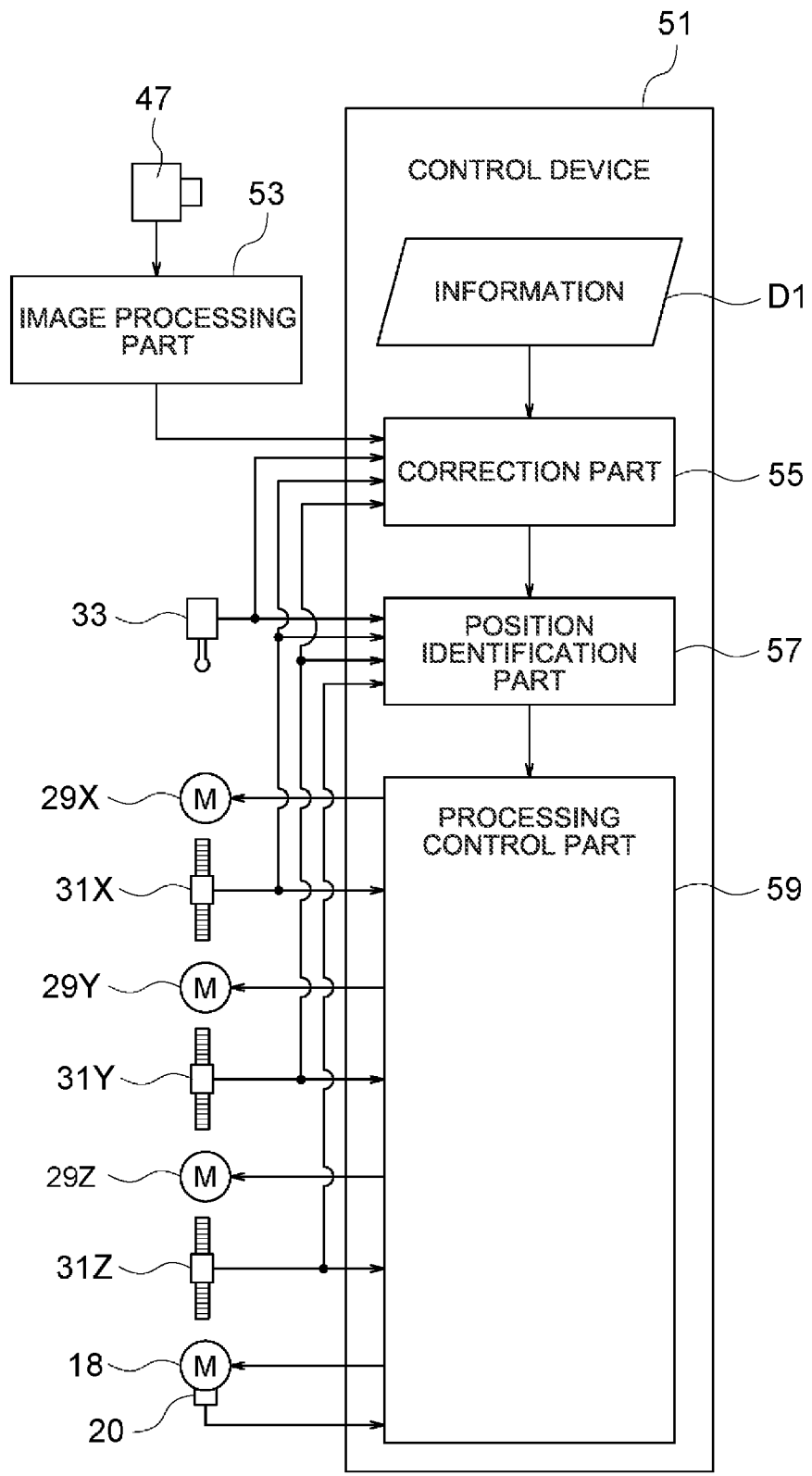
FIG. 4 is a block diagram showing the configuration of a control system in the processing machine in FIG. 1.

FIG. 4 is a block diagram showing an outline of the configuration of the control system in the processing machine 1. Note that, in this view, for convenience of illustration, some signal paths are omitted.

On the left side on the plane in FIG. 4, the camera 47, touch sensor 33, drive sources 29, sensor 31, and spindle motor 18 which have been explained up to here are schematically shown. Further, FIG. 4 shows a block diagram showing various function parts constructed in the control unit 5.

The control unit 5 for example has a control device 51 which controls the machine body 3 in the processing machine 1 and an image processing device 53 which performs processing based on an image captured by the camera 47.

The control device 51 for example stores information D1. The information D1 is an inclusive concept of the various information stored in the control device 51. The information included in the information D1 is for example the information concerned with the correspondence between the sensor 31 and the machine coordinate system, information D2 of the target shape of the reference workpiece 105 (FIG. 6), reference gauge information D3 (FIG. 6) showing the position of the reference gauge 35 at the time when no deviation occurs in the position of the touch sensor 33, and touch sensor position information D4 (FIG. 6) showing the correspondence between the machine coordinate system and the position of the touch sensor 33. The information included in the information D1 may be input by a manufacturer of the processing machine 1, may be input by an operator, or may be acquired by the processing machine 1. Further, the information included in the information D1 may be suitably corrected (updated) by the processing machine 1 based on the measurement results of the amount of deviation.

Further, the control device 51 has a correction part 55, position identification part 57, and processing control part 59 which perform processing based on the information D1 described above. The processing control part 59 performs control of various types of drive sources (29 and 18) for processing of the workpiece 103 by the tool 101. The correction part 55 and position identification part 57 perform correction of that control. Specifically, this is as follows.

The correction part 55, as explained above, performs processing measuring the amount of deviation of the position of the tool 101 and amount of deviation of the position of the touch sensor 33 and correcting the control by the processing control part 59 based on the measured amounts of deviation. The processing of the correction part 55 includes for example acquisition of the information from various types of sensors (31, 33, and 47) and output of control commands to the drive sources 29 and camera 47.

The position identification part 57 performs processing measuring the position of the workpiece 103 by the touch sensor 33 and identifying the correspondence between the relative positions of the workpiece 103 and tool 101 and the detection values of the sensors 31 based on the measured position. From another viewpoint, the position identification part 57 corrects the control by the processing control part 59 based on the measured amount of deviation of the position of the workpiece 103 (from another viewpoint, sets the origin of the machine coordinate system). The processing of the position identification part 57 for example includes acquisition of information from various types of sensors (31 and 33) and output of control commands to the drive sources 29.

In the example shown, before the measurement of the position of the workpiece 103 by the position identification part 57, by the correction part 55, the amount of deviation of the position of the touch sensor 33 is measured, and the correction of the touch sensor position information D4 (from another viewpoint, setting of origin of the machine coordinate system) is carried out based on the measured amount of deviation. Accordingly, the position of the workpiece 103 which is measured by the position identification part 57 is one after correction according to the measured amount of deviation of the position of the touch sensor 33. In other words, the correction part 55 indirectly corrects the control of the processing control part 59 through the position identification part 57. Note that, the measurement of the workpiece 103 by the position identification part 57 may be carried out without the correction of the touch sensor position information D4 as well. Further, the correction based on the measured amount of deviation of the position of the touch sensor 33 may be directly carried out with respect to the processing control part 59.

The processing control part 59, for example, controls the various types of drive sources (29 and 18) according to the NC program including commands concerned with the drive of the tool 101. For example, the processing control part 59 controls the drive source 29 based on the detection values of the sensors 31 so that the tool 101 moves to the coordinates designated according to the NC program. At this time, for example, the coordinates of the NC program or the machine coordinate system of the processing machine 1 are shifted by the correction part 55 by the amount of deviation of the tool 101. Due to this, the correction of the control based on the amount of deviation is carried out. Further, the processing control part 59, for example, controls the spindle motor 18 based on the rotation speed of the spindle motor 18 detected by the rotation sensor 20 (for example encoder or resolver) so that the tool 101 rotates at the rotation speed designated according to the NC program.

The image processing device 53, for example, controls the camera 47 to acquire an image (strictly speaking, image data) of the tool 101 and calculates the amount of deviation of the position of the tool 101 based on the acquired image. This amount of deviation is utilized for correction of the control of the processing control part 59 by the correction part 55. Further, the image processing device 53 for example controls the camera 47 to acquire an image (strictly speaking, image data) of the touch sensor 33 and calculates the amount of deviation of the position of the touch sensor 33 based on the acquired image. This amount of deviation is utilized for correction of the control of the processing control part 59 by the correction part 55 (for example correction of the touch sensor position information D4).

The various function parts (51, 53, 55, 57, and 59) included in the control unit 5 are for example constructed by a computer running a program as already explained. The various function parts may be constructed in hardware which are different from each other or may be constructed in hardware which are the same as each other. For example, the control device 51 and the image processing device 53 may be constructed in different computers which communicate via cables or communicate wirelessly or may be constructed in the same computer. Further, for example, part of the function parts of the image processing device 53 may be built in the camera 47 as well.

The various function parts illustrated in FIG. 4 are convenient conceptual parts for explaining the operation of the control unit 5. Accordingly, for example, the various function parts need not be differentiated in the program. Further, for example, one operation may be performed by two or more function parts as well.

(One Example of Configuration of Control System in Each Axis)

Figure 5:
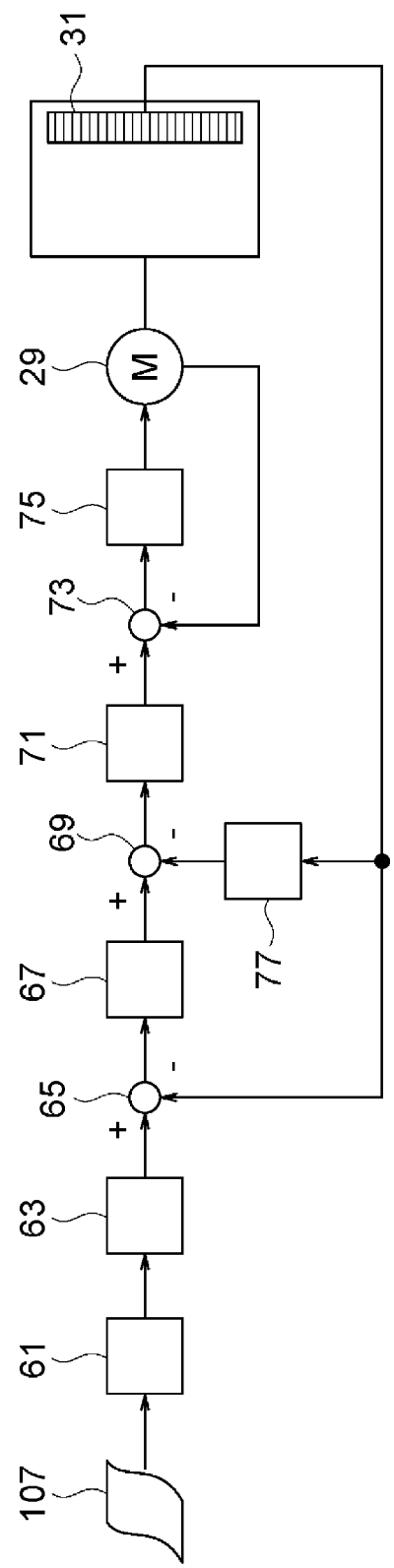
FIG. 5 is a view showing details of a processing control part in the control system shown in FIG. 4.

FIG. 5 is a block diagram showing an example of the configuration of the control system in each axis. From another viewpoint, it is a view showing details of part of the processing control part 59. In the view, the parts other than the NC program 107, drive sources 29, and sensors 31 correspond to the parts of the processing control part 59.

The NC program 107 includes information of the commands concerning the drive of each axis. For example, the NC program 107 includes the information of commands concerning movements of the table 23, saddle 13, and spindle head 17. The information of commands concerning movements for example includes a plurality of positions on a path of movement and information of the speed between the two or more positions.

The interpretation part 61 reads out and interprets the NC program 107. Due to this, for example, the information of a plurality of positions which are passed in order and the speed between the two or more positions is acquired for each of the table 23, saddle 13, and spindle head 17.

The interpolation part 63 calculates the target position for each predetermined control cycle based on the information acquired by the interpretation part 61. For example, a plurality of target positions which must be reached are set between the two positions which are passed in order for each control cycle based on the two positions and the speed between those two positions. The interpolation part 63 calculates the target position for each control cycle for each axis and outputs the results to the addition part 65.

The configurations of the addition part 65 and the following parts are provided for each axis. That is, the processing control part 59 has three configurations following the addition part 65 and shown on the right side on the drawing sheet in total. Further, the configuration following the addition part 65 is for example the same as the known configuration concerned with the feedback control. Further, input of the target position for each control cycle from the interpolation part 63 to the addition part 65 explained above and the operation which will be explained below are repeatedly carried out in the control cycle.

In the addition part 65, an error between the target position for each control cycle and the position detected by the sensor 31 is calculated. The calculated error (target amount of movement for each control cycle) is input to the position control part 67. The position control part 67 multiplies the input error by a predetermined gain to calculate the target speed for each control cycle and outputs the result to the addition part 69. The addition part 69 calculates an error between the input target speed for each control cycle and a detection speed which is obtained by differentiation of the detection position by the sensor 31 by a differentiation part 77 and outputs the result to the speed control part 71. The speed control part 71 multiples the input error by a predetermined gain to calculate the target current (target torque) for each control cycle and outputs the result to the addition part 73. The addition part 73 calculates an error between the input target current for each control cycle and the detection current from a not shown current detection part and outputs the result to the current control part 75. The current control part 75 supplies power in accordance with the input error to the drive sources 29.

The above description is just one example and may be suitably changed. For example, although not particularly shown, feed forward control may be added as well. In place of the current loop, an acceleration loop may be inserted as well. In a case where the drive source is a rotary electric motor, and a rotation sensor (for example encoder or resolver) which detects the rotation of that is provided, the speed control may be carried out based on the detection value of that rotation sensor as well.

(One Example of Configuration of Correction Part)

Figure 6:
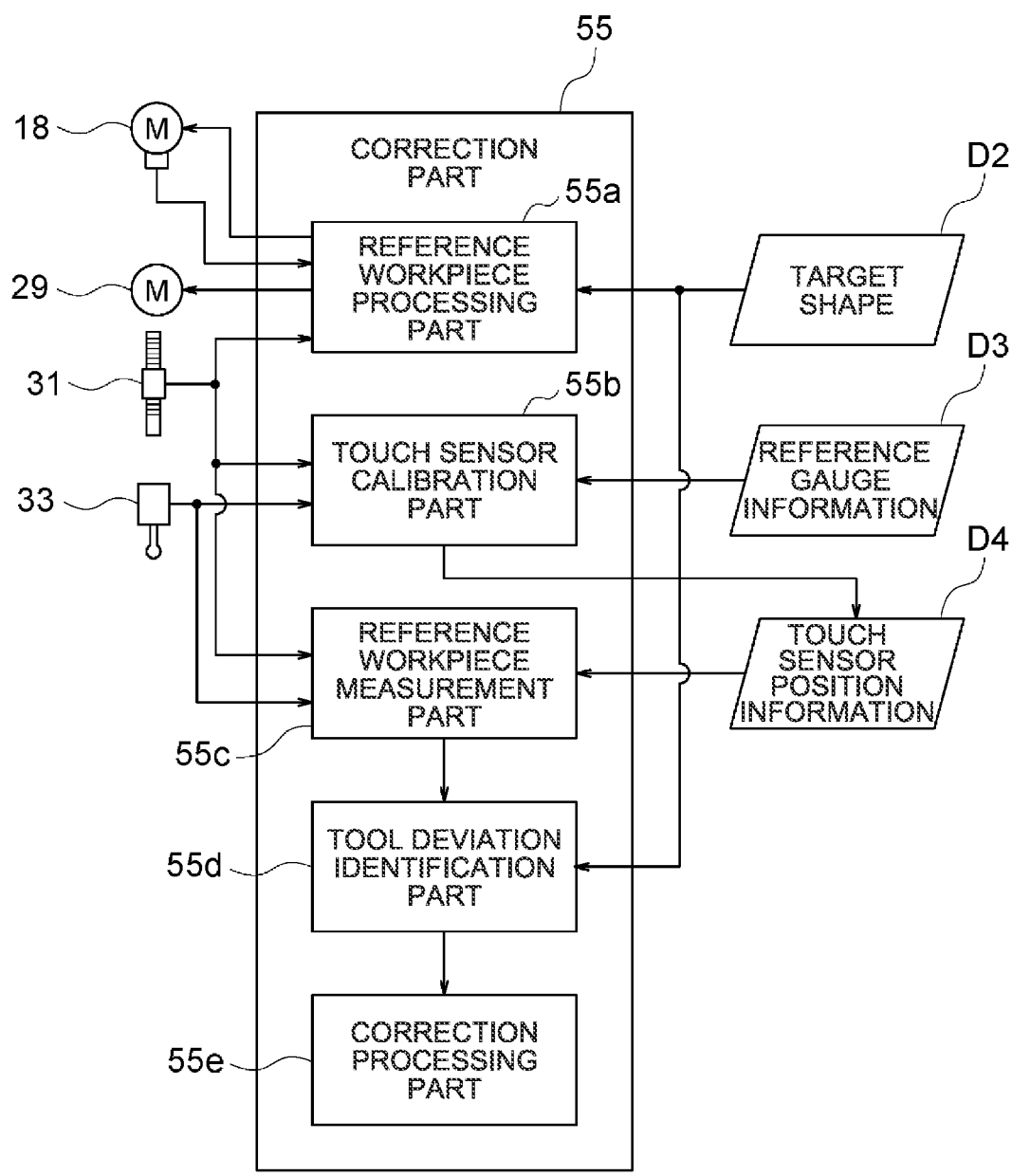
FIG. 6 is a view showing details of a correction part in the control system shown in FIG. 4.

FIG. 6 is a block diagram showing one example of the configuration of the correction part 55 shown in FIG. 4.

The correction part 55, as already explained, for example, is a function part which is configured by a computer running a program. Further, it includes various function parts (55a to 55e). Here, mainly, the function parts concerned with the measurement and correction utilizing the reference workpiece 105 and the measurement and correction utilizing the reference gauge 35 are shown. Illustration of the function part concerned with the measurement and correction utilizing the imaging part 37 is omitted. A summary of the function parts is given below.

The reference workpiece processing part 55a controls the drive sources 29 and the spindle motor 18 so that the reference workpiece 105 becomes the predetermined shape based on the information D2 of the target shape of the reference workpiece 105. This operation may be for example substantially the same as the operation of the processing control part 59 based on the NC program 107.

The touch sensor calibration part 55b performs processing for measuring the position of the reference gauge 35 based on the detection value of the sensor 31 at the time when contact of the touch sensor 33 against the reference gauge 35 is detected by the touch sensor 33. Further, the touch sensor calibration part 55b identifies the amount of deviation of the touch sensor 33 based on the difference between the measured position of the reference gauge 35 and the position of the reference gauge information D3 stored in advance (the position of the reference gauge 35 when the touch sensor 33 is located at the already explained second reference position). The touch sensor calibration part 55b corrects the touch sensor position information D4 showing the correspondence between the position of the touch sensor 33 and the detection value of the sensor 31 based on the identified amount of deviation. For example, the touch sensor calibration part 55b sets the origin in the machine coordinate system so that the machine coordinate system of the processing machine 1 is shifted by the identified amount of deviation.

The reference workpiece measurement part 55c measures the shape (position) of the processed reference workpiece 105 based on the detection value of the sensor 31 at the time when contact of the touch sensor 33 against the processed reference workpiece 105 is detected by the touch sensor 33. At this time, the reference workpiece measurement part 55c for example performs measurement by using the touch sensor position information D4 (for example information of the machine coordinate system after the shift) which is corrected by the touch sensor calibration part 55b. Accordingly, from the shape of the measured reference workpiece, error caused by the amount of deviation of the touch sensor 33 is reduced.

The tool deviation identification part 55d identifies the amount of deviation of the position of the tool 101 based on the information D2 of the target shape of the reference workpiece 105 and the information of the shape of the reference workpiece 105 which is measured by the reference workpiece measurement part 55c (based on the difference between the target shape and the measured shape).

The correction processing part 55e corrects the control by the processing control part 59 based on the amount of deviation of the position of the tool 101 identified by the tool deviation identification part 55d. Note that, the amount of deviation of the position of the tool 101 is measured in the state where the touch sensor position information D4 is corrected based on the amount of deviation of the position of the touch sensor 33, and the correction of the control is carried out based on the measured amount of deviation of the position of the tool 101, therefore the correction processing part 55e may be said to be correcting the control by the processing control part 59 based on the amount of deviation of the position of the touch sensor 33.

(Method of Correction of Control)

The method of correction based on the amount of deviation of the tool 101 may be a known method or a method applying a known method. Further, in the control loop explained with reference to FIG. 5, correction may be carried out at any stage. Below, some examples of the method of correction will be shown. In the processing machine 1, the following corrections are selectively employed.

The processing machine 1 holds information of the machine coordinate system. The NC program 107 for example designates the operation of the processing machine 1 by using the coordinates in this machine coordinate system. Accordingly, as already referred to, the correction processing part 55e in the processing machine 1 may correct the machine coordinate system so as to shift the machine coordinate system by the same amount as the absolute value of the amount of deviation and in the same direction as the deviation. Alternatively, the correction processing part 51e may correct the NC program 107 so as to shift the coordinates of the NC program 107 by the same amount as the absolute value of the amount of deviation and in the direction opposite to the deviation. In other words, the correction processing part 51e may prepare a corrected NC program.

The interpretation part 61 inputs the coordinates obtained by interpreting the NC program 107 to the interpolation part 63. At this time, the correction processing part 51e may intervene between the two and correct the coordinates from the interpretation part 61 so as to shift the coordinates from the interpretation part 61 by the same amount as the absolute value of the amount of deviation and in the direction opposite to the deviation and input the results to the interpolation part 63.

The interpolation part 63 calculates the target position for each control cycle based on the input coordinates and inputs the results to the addition part 65. At this time, the correction processing part 51e may intervene between the two and correct the target position so as to shift the target position (coordinates) from the interpolation part 63 by the same amount as the absolute value of the amount of deviation and in the direction opposite to the deviation and input the results to the addition part 65.

The detection positions by the sensors 31 are fed back to the addition part 65. At this time, the correction processing part 51e may intervene between the two and correct the detection position so as to shift the detection position (coordinates) from the sensors 31 by the same amount as the absolute value of the amount of deviation and in the same direction as the deviation and input the results to the addition part 65.

The addition part 65 inputs error between the target position from the interpolation part 63 and the detection position from the sensor 31 to the position control part 67. At this time, the correction processing part 51e may intervene between the addition part 65 and the position control part 67 and correct the error so as to shift the error by the same amount as the absolute value of the amount of deviation and in the direction opposite to the deviation and input the results to the addition part 65.

The correction based on the amount of deviation in the X-direction, correction based on the amount of deviation in the Y-direction, and correction based on the amount of deviation in the Z-direction are for example realized by the same method of correction among the above explained various methods of correction. However, mutually different correction methods may be utilized in mutually different directions as well.

(Variations of Calibration and Utilization of Touch Sensor)

As the mode of utilization of the touch sensor 33, the mode of performing a shift (correction) of the machine coordinate system or a shift (correction) of the coordinates of the NC program (from another viewpoint, performing correction of the control by the processing control part 59) in accordance with the amount of deviation between the measured position of the workpiece 103 and the supposed position of the workpiece 103 was already referred to. The amount of deviation of the position of the workpiece 103, in the same way as the correction according to the amount of deviation of the position of the tool 101 described above, may be utilized not only for the correction of the machine coordinate system or correction of the NC program 107, but also in various other modes. For example, the correction based on the amount of deviation of the position of the workpiece 103 may be made correction of the coordinates from the interpretation part 61, correction of the target position from the interpolation part 63, correction of the detection positions from the sensors 31, or correction of the error from the addition part 65. The explanation of the method of correction based on the amount of deviation of the tool 101 explained above may be cited for the correction based on the amount of deviation of the position of the workpiece 103 unless a contradiction arises. However, at the citing it, the "same direction as the amount of deviation" and the "opposite direction to the amount of deviation" are replaced by each other.

In the same way, the correction based on the amount of deviation of the touch sensor 33 may be utilized not only for the shift (correction) of the machine coordinate system or shift (correction) of the NC program 107, but also in various other modes. For example, the correction based on the amount of deviation of the touch sensor 33 may be made the correction of the coordinates from the interpretation part 61, correction of the target position from the interpolation part 63, correction of the detection positions from the sensors 31, or correction of the error from the addition part 65. The explanation of the method of correction based on the amount of deviation of the tool 101 explained above may be cited for the correction based on the amount of deviation of the position of the touch sensor 33 unless a contradiction arises.

(Example of Processing Procedure)

Figure 9A:
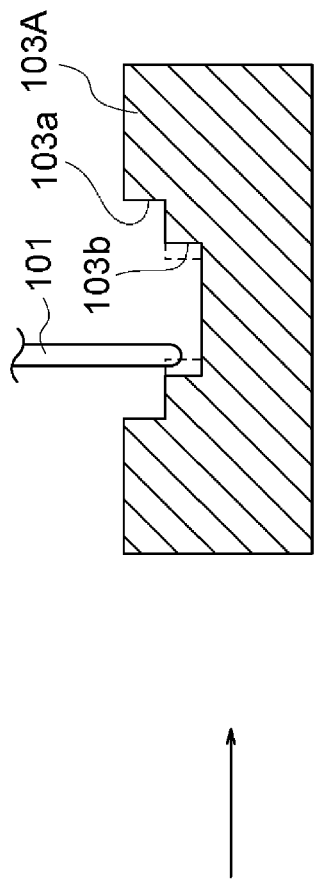
FIG. 9A and FIG. 9B are views showing a continuation of FIG. 8D.
Figure 9B:
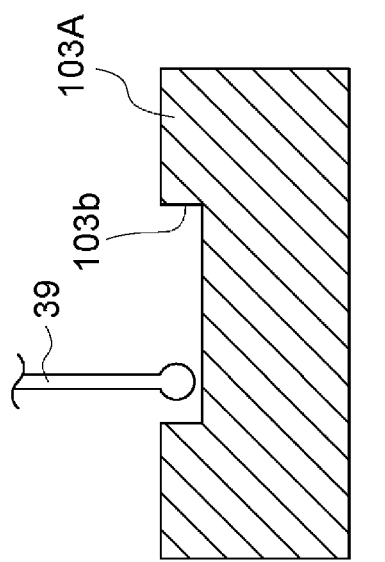

FIG. 7A to FIG. 9B are schematic views showing one example of the processing procedure. The machining process shown in the views advances from FIG. 7A to FIG. 9B in the numerical order of the drawings. Further, as shown in FIG. 9B, in a workpiece 103A of one example of the workpiece 103, a concentric first recessed portion 103a and second recessed portion 103b are formed. In the present embodiment, the concentricity of the first recessed portion 103a and second recessed portion 103b can be made high. For example, the concentricity can be made to 1 µm or less. Specifically, this is as follows.

Figure 7A:
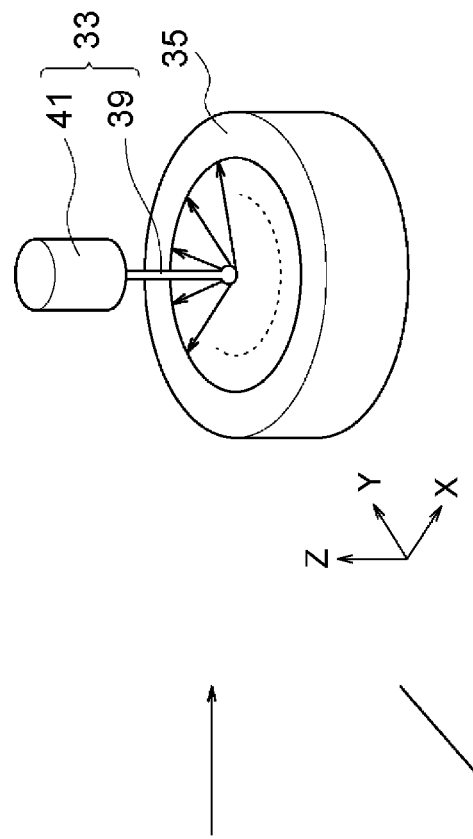
FIG. 7A, FIG. 7B, FIG. 7C, and FIG. 7D are views showing one example of processing procedure by the processing machine in FIG. 1.

In FIG. 7A, the processing machine 1 (reference workpiece processing part 55a) is cutting the reference workpiece 105 by the tool 101. The cutting is carried out so that the shape of the reference workpiece 105 becomes the target shape shown in the information D2 as already explained. In the example shown, it is a rectangular state having two sides parallel to the X-direction and two sides parallel to the Y-direction (however, recessed portions 105a are formed), and the four sides are processed by the tool 101. Note that, the recessed portions 105a may be formed from the initial stage or may be formed by the tool 101 in the shown process.

Figure 7B:
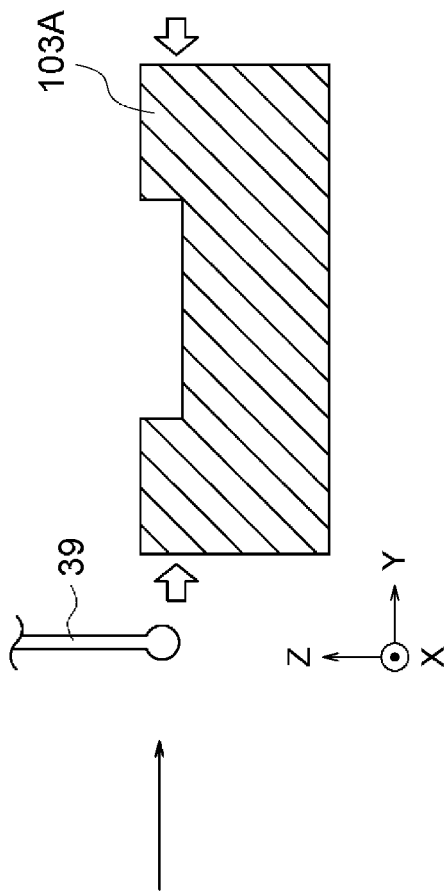

In FIG. 7B, the processing machine 1 (touch sensor calibration part 55b) performs calibration of the touch sensor 33. Specifically, as already explained, the processing machine 1 measures the position of the reference gauge 35 based on the detection values of the sensors 31 at the time when contact of the touch sensor 33 against the reference gauge 35 is detected by the touch sensor 33. Further, the processing machine 1 for example performs the correction of the machine coordinate system based on the amount of deviation between the measured position and the position of the reference gauge information D3.

In the example shown, the processing machine 1 makes the touch sensor 33 contact the inner circumferential surface of the ring-shaped reference gauge 35 in three or more directions in the XY plane. Due to this, for example, the processing machine 1 can identify the position of the center of the reference gauge 35 (coordinates in the XY coordinate system).

Figure 7C:
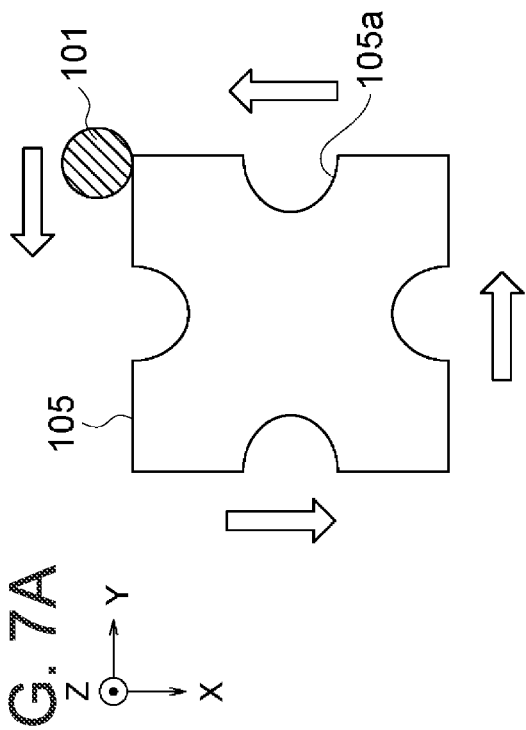

In FIG. 7C, the processing machine 1 (reference workpiece measurement part 55c) measures the shape (position from another viewpoint) of the reference workpiece 105. Specifically, as already explained, the processing machine 1 measures the position of the reference workpiece 105 based on the detection values of the sensors 31 at the time when contact of the touch sensor 33 with respect to the reference workpiece 105 is detected by the touch sensor 33. Further, the processing machine 1 (tool deviation identification part 55d) calculates the difference between the measured position of the reference workpiece 105 and the target position indicated by the information D2 as the amount of deviation of the tool 101.

In the example shown, the processing machine 1 measures in order the positions in X-direction of the two sides which face each other in the X-direction and the positions in Y-direction of the two sides which face each other in the Y-direction for four positions in total. Due to this, for example, the processing machine 1 can identify the position of the center (coordinates in the XY coordinate system) of the reference workpiece 105.

Figure 7D:
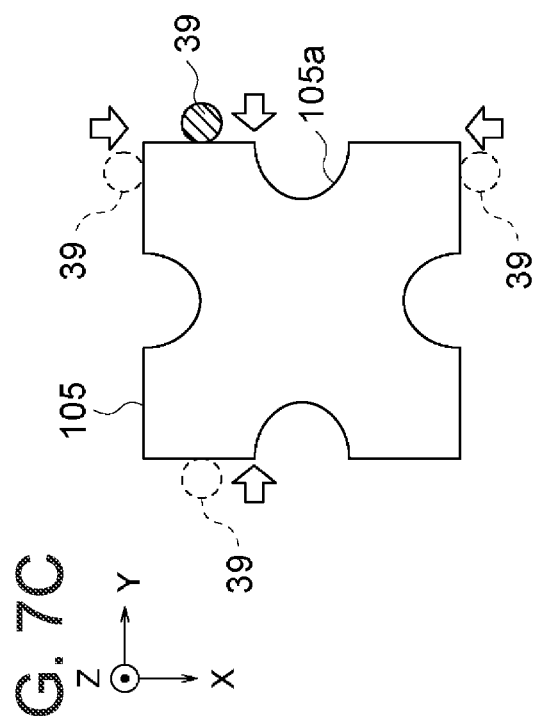

In FIG. 7D, the processing machine 1 (position identification part 57) measures the position of the workpiece 103A. Specifically, as already explained, the processing machine 1 measures the position of the workpiece 103A based on the detection values of the sensors 31 at the time when contact of the touch sensor 33 against the workpiece 103A is detected by the touch sensor 33. Further, the processing machine 1, for example, performs correction of the machine coordinate system (setting of origin) based on the measured position of the workpiece 103A.

In the example shown, the processing machine 1 measures the position of the outer circumferential surface of the workpiece 103A. FIG. 7D is a cross-sectional view, therefore only the position in the Y-direction is measured. However, naturally the position in the X-direction (or position in the other direction) may be measured. Further, the processing machine 1 identifies the position (coordinates in the XY coordinate system) of a suitable part (for example center) in the workpiece 103A.

In the example shown, a recessed portion (notation is omitted) which becomes the first recessed portion 103a by extension in the diameter direction is formed. However, depending on the type etc. of the tool 101, the recessed portion need not be formed at the time of FIG. 7D either.

In FIG. 8A, the processing machine 1 (processing control part 59) cuts the workpiece 103A according to the NC program 107 to form the first recessed portion 103a. At this time, the processing machine 1 (correction processing part 55e) corrects the control by the processing control part 59. The method of correction may be various ones as already explained.

As described above, the first recessed portion 103a is formed with a high precision with respect to the original shape (for example the shape of the outer circumferential surface) of the workpiece 103A. FIG. 8B to FIG. 9B continuing from FIG. 8A show the procedure of forming a second recessed portion 103b. Basically, they are the same as FIG. 7A to FIG. 8A showing the procedure of forming the first recessed portion 103a. However, for example, there may be the following differences.

In FIG. 8B, the processing machine 1, unlike FIG. 7A, is cutting only part of each side (one side with respect to the recessed portion 105a) in the reference workpiece 105. From another viewpoint, only parts in the cut parts shown in FIG. 7A are cut. From still another viewpoint, at least parts of the parts in the cut parts shown in FIG. 7A are not cut and remain. Further, in FIG. 8D, the positions of the portions cut in FIG. 8B are measured.

According to this, for example, the amount of cutting can be reduced in FIG. 8B. As a result, for example, the time for measuring the amount of deviation of the tool 101 can be shortened. Further, for example, the cut parts shown in FIG. 7A remain, therefore the positions of these parts can be measured again. Due to this, for example, the amount of deformation caused by temperature change etc. of the reference workpiece 105 can be measured. This amount of deformation may be for example utilized for estimation of the amount of deformation of the workpiece 103A where the reference workpiece 105 and the workpiece 103A are formed by the same material.

Note that, in FIG. 8B, in the same way as FIG. 7A, the entireties of the sides may be cut as well. Conversely, in FIG. 7A, in the same way as FIG. 8B, only parts of the sides may be cut as well. In this case, the parts cut in FIG. 7A and the parts cut in FIG. 8B may overlap in part or entirety or may not overlap.

In FIG. 9A, the processing machine 1, unlike FIG. 7D, is measuring not the position of the outer circumferential surface of the workpiece 103A, but the position of the inner circumferential surface of the first recessed portion 103a. Due to this, for example, compared with the mode where the position of the outer circumferential surface of the workpiece 103A is measured in FIG. 9A (this mode is also included in the present disclosure), the concentricity of the first recessed portion 103a and the second recessed portion 103b is improved.

In FIG. 9B, the processing machine 1 does not expand the diameter of the recessed portion as shown in FIG. 8A, but forms a new second recessed portion 103b having a smaller diameter than the first recessed portion 103a in the bottom surface of the first recessed portion 103a. However, the cutting in FIG. 8A may also be processing of forming a new first recessed portion 103a in the bottom surface of the recessed portion as well.

The processing machine 1 (control device 51) may automatically perform the series of operations from FIG. 7A to FIG. 9B (operation by an operator may be unnecessary from the start to the end of the series of operations). However, part of the operation may be carried out triggered by operation by an operator.

As described above, in the present embodiment, the processing machine 1 has the workpiece holding part (table 23), tool holding part (spindle 19), first drive source (X-axis drive source 29X), first sensor (X-axis sensor 31X), touch sensor 33, control device 51, and reference workpiece holding part (in the present embodiment, the table 23 as the workpiece holding part is used also for the reference workpiece holding part). The table 23 holds the workpiece 103. The spindle 19 holds the tool 101. The X-axis drive source 29X makes the table 23 and the spindle 19 relatively move in the first direction (X-direction) The X-axis sensor 31X detects the relative positions of the table 23 and the spindle 19 in the X-direction. The touch sensor 33 is arranged at the position having a certain positional relationship with the spindle 19. Due to this, along with the relative movements of the table 23 and the spindle 19 in the X-direction by the X-axis drive source 29X, the touch sensor 33 relatively moves in the X-direction with respect to the table 23. The control device 51 controls the X-axis drive source 29X based on the detection value of the X-axis sensor 31X. The reference workpiece holding part (table 23) holds the reference workpiece 105 for measuring the deviation of the position of the tool 101. The reference workpiece holding part (table 23) relatively moves in the X-direction with respect to the spindle 19 along with the relative movements in X-direction of the workpiece holding part (table 23) and the spindle 19 by the X-axis drive source 29X.

Further, in the present embodiment, the control device 51 has the processing control part 59 and correction part 55. The processing control part 59 performs control of the X-axis drive source 29X based on the detection value of the X-axis sensor 31X to process the workpiece 103 by the tool 101. The correction part 55 corrects the control of the processing control part 59. The correction part 55 has the reference workpiece processing part 55a, reference workpiece measurement part 55c, tool deviation identification part 55d, and correction processing part 55e. The reference workpiece processing part 55a controls the X-axis drive source 29X based on the detection value of the X-axis sensor 31X so that the reference workpiece 105 is processed from the X-direction by the tool 101 to become the predetermined target shape. The reference workpiece measurement part 55c measures the shape of the reference workpiece 105. At this time, the stored touch sensor position information D4 which shows the correspondence between the position of the touch sensor 33 and the detection value of the X-axis sensor 31X is utilized. Further, the detection value of the X-axis sensor 31X at the time when the contact in X-direction of the touch sensor 33 with respect to the processed reference workpiece 105 is detected by the touch sensor 33 is utilized. The tool deviation identification part 55d identifies a first amount of deviation of the position of the tool 101 in the X-direction based on the amount of deviation in X-direction between the above target shape and the above measured shape. The correction processing part 55e corrects the control of the processing control part 59 based on the identified first amount of deviation.

From another viewpoint, in the present embodiment, the manufacturing method of the processed object has a step of using the processing machine 1 described above, bringing the workpiece 103 and the tool 101 into contact, and processing the workpiece 103 into the processed object.

Accordingly, the amount of deviation of the position of the tool 101 can be measured. Further, by correcting the control of processing based on this amount of deviation, the precision of processing can be improved.

The measurement of the amount of deviation of the tool 101 is carried out by the reference workpiece 105, touch sensor 33, and sensors 31. The sensors 31 are usually indispensable for the control of the processing. In general, there is a high probability of providing the touch sensor 33 in order to detect the position of the workpiece 103. Accordingly, the measurement of the amount of deviation of the position of the tool 101 in the present embodiment is realized by just attaching the reference workpiece 105 to a general processing machine. The reference workpiece 105 is one to be processed by the tool 101, therefore does not have to be precise in shape and can be fabricated at a low cost. Accordingly, for example, the method of measurement of the amount of deviation of the position of the tool 101 according to the present embodiment is inexpensively realized compared with the method of measuring the amount of deviation of the position of the tool 101 by the imaging part 37.

The measurement of the amount of deviation of the position of the tool 101 by the imaging part 37 generally can only measure the amount of deviation of the position of the tool 101 in a direction (Z-direction and/or X-direction in the present embodiment) perpendicular to the imaging direction (Y-direction in the present embodiment). Accordingly, for example, when measuring the amount of deviation of the position of the tool 101 in the three-axial directions, two or more imaging parts 37 are necessary. However, by measurement of the amount of deviation of the position of the tool 101 according to the method of measurement using the reference workpiece 105 in at least one axial direction, the number of the imaging parts 37 can be reduced. For example, the number of the imaging parts 37 can be made one or the imaging part 37 can be eliminated. As a result, the costs of the processing machine 1 are reduced.

The workpiece holding part (table 23) may act also as the reference workpiece holding part and may hold the workpiece 103 and reference workpiece 105 so that the workpiece 103 and the reference workpiece 105 become unable to relatively move with respect to each other.

In this case, for example, the precision of measurement of the amount of deviation of correspondence between the relative positions of the workpiece 103 and the tool 101 and the detection value of the sensor 31 is improved. For example, when measuring the amount of deviation of the position of the tool 101 in the Y-direction by the reference workpiece 105, it is also possible to attach the reference workpiece 105 not to the table 23, but to the bed 21 (this mode may also be included in the art according to the present disclosure). In this case, however, the amounts of deformation of the guide 25 and table 23 are not reflected in the amount of deviation of the position of the tool 101. However, by the reference workpiece 105 being held by the table 23 in the same way as the workpiece 103, the amounts of deformation of the guide 25 and table 23 are reflected in the amount of deviation of the position of the tool 101. Due to this, the precision of measurement of the amount of deviation of the correspondence between the relative positions of the workpiece 103 and the tool 101 and the detection value of the sensor 31 (from another viewpoint, the amount of deviation of the position of the tool 101) is improved. In turn, the precision of processing of the workpiece 103 by the tool 101 is improved.

The reference workpiece processing part 55a may control the X-axis drive source 29X so that the reference workpiece 105 is processed from one side (for example +X side) in the first direction (X-direction) and then processed from the other side (for example −X side) in the X-direction. The tool deviation identification part 55d identifies the amount of deviation between the target shape and the measured shape as the above first amount of deviation for a representative position (for example an intermediate position of following two sides) calculated based on the position of the part (one side parallel to the Y-direction in the reference workpiece 105) which is processed from one side in the X-direction and the position of the part (opposite side to the one side) which is processed from the other side in the X-direction.

In this case, for example, compared with a mode where the shape (position) of the reference workpiece 105 is measured from only the +X side or −X side (this mode is also included in the art according to the present disclosure), the position of the reference workpiece 105 can be identified while considering the influence of thermal deformation of the reference workpiece 105 in the X-direction. As a result, the precision of measurement of the amount of deviation of the tool 101 is improved.

The processing machine 1 may have the reference gauge holding part which holds the reference gauge 35 for measuring the deviation of position of the touch sensor 33 (in the present embodiment, the table 23 provided as the workpiece holding part is used also as the reference gauge holding part). The reference gauge holding part (table 23) may relatively move in the X-direction with respect to the spindle 19 along with the relative movements of the workpiece holding part (table 23) and the tool holding part (spindle 19) in the first direction (X-direction) by the first axis drive source (X-axis drive source 29X). The correction part may further have a touch sensor calibration part 55b which calibrates the touch sensor position information D4 based on the deviation between the position of the reference gauge 35 based on the detection value of the first sensor (X-axis sensor 31X) at the time when contact in X-direction of the touch sensor 33 with respect to the reference gauge 35 is detected by the touch sensor 33 and the position of the reference gauge 35 which is stored in advance (the position indicated by the reference gauge information D3). The reference workpiece measurement part 55c may measure the shape of the reference workpiece 105 based on the calibrated touch sensor position information D4.

In this case, for example, the influence of the amount of deviation of the position of the touch sensor 33 exerted upon the amount of deviation of the position of the tool 101 which is measured by utilizing the touch sensor 33 and reference workpiece 105 is reduced. That is, the precision of measurement of the amount of deviation of the tool 101 is improved.

The workpiece holding part (table 23) may act also as the reference gauge holding part and may hold the workpiece 103 and the reference workpiece 105 so that the workpiece 103 and the reference gauge 35 become unable to relatively move with respect to each other.

In this case, for example, the precision of measurement of the amount of deviation of the correspondence between the relative positions of the workpiece 103 and the touch sensor 33 and the detection value of the sensor 31 is improved. For example, when measuring the amount of deviation of the position of the touch sensor 33 in the Y-direction by the reference gauge 35, it is also possible to attach the reference gauge 35 not to the table 23, but to the bed (this mode is also included in the art according to the present disclosure). In this case, however, the amounts of deformation of the guide 25 and table 23 are not reflected in the amount of deviation of the position of the touch sensor 33. However, by the reference gauge 35 being held by the table 23 in the same way as the workpiece 103, the amounts of deformation of the guide and the table 23 are also reflected in the amount of deviation of the position of the touch sensor 33. Due to this, the precision of measurement of the amount of deviation of the correspondence between the relative positions of the workpiece 103 and the touch sensor 33 and the detection value of the sensor 31 (from another viewpoint, the amount of deviation of the position of the touch sensor 33) is improved.

The control device 51 may further have the position identification part 57 which identifies the correspondence between the relative positions of the workpiece 103 and the tool 101 and the detection value of the X-axis sensor 31X based on the detection value of the first sensor (X-axis sensor 31X) at the time when the contact of the touch sensor 33 with respect to the workpiece 103 is detected by the touch sensor 33. The processing control part 59 may perform control of the first drive source (X-axis drive source 29X) based on the above identified correspondence and the detection value of the X-axis sensor 31X.

In this case, for example, the control of the position of the tool 101 is carried out based on the measured position of the workpiece 103, therefore the precision of processing is improved. Further, it can be said that the touch sensor 33 for detecting the position of the workpiece 103 is utilized for measurement of the position of the reference workpiece 105 (measurement of the amount of deviation of the position of the tool 101). Therefore, as explained above, the increase of costs of the processing machine 1 is reduced.

The processing machine 1 may have a configuration similar to that described above also in the second direction (Y-direction) in addition to the first direction (X-direction). That is, the processing machine 1 may further have a second drive source (Y-axis drive source 29Y) which makes the workpiece holding part (table 23) and the tool holding part (spindle 19) relatively move in the second direction (Y-direction) perpendicular to the first direction (X-direction) and a second sensor (Y-axis sensor 31Y) which detects the relative positions of the table 23 and the spindle 19 in the Y-direction. The reference workpiece holding part (in the present embodiment, the table 23 provided as the workpiece holding part is used also as the reference workpiece holding part) may relatively move in the Y-direction with respect to the spindle 19 along with the relative movements of the workpiece holding part (table 23) and the spindle 19 in the Y-direction by the Y-axis drive source 29Y. The processing control part 59 may perform the control of the Y-axis drive source 29Y based on the detection value of the Y-axis sensor 31Y to process the workpiece 103 by the tool 101. The reference workpiece processing part 55*a* may control the Y-axis drive source 29Y based on the detection value of the Y-axis sensor 31Y so that the reference workpiece 105 is processed from the Y-direction by the tool 101 to become the target shape. The reference workpiece measurement part 55*c* may measure the shape of the reference workpiece 105 based on the detection value of the Y-axis sensor 31Y at the time when contact in Y-direction of the touch sensor 33 with respect to the processed reference workpiece 105 is detected by the touch sensor 33 and the touch sensor position information D4 showing the correspondence between the position of the touch sensor 33 and the detection value of the Y-axis sensor 31Y. The tool deviation identification part 55*d* may identify a second amount of deviation of the position in Y-direction of the tool 101 based on the amount of deviation in the Y-direction between the above target shape and the measured shape. The correction processing part 55*e* may correct the control of the processing control part 59 based on the above identified second amount of deviation.

In this case, for example, the amount of deviation of the tool 101 in the Y-direction is measured in addition to the X-direction, and that measured amount of deviation is used for the correction of the control of the processing, therefore the precision of the processing is improved. Further, for example, the amount of deviation of the position of the tool 101 is measured in two directions by the touch sensor 33 and the reference workpiece 105. Therefore, if the amount of deviation of the position of the tool 101 is measured in one further direction, the amount of deviation of the position of the tool 101 can be measured in three directions. As a result, the degree of freedom of design of the configuration for measuring the amount of deviation in three directions is improved. For example, as the configuration for measuring the amount of deviation of the position of the tool 101 by imaging, there are a configuration enabling measurement the amount of deviation in two directions perpendicular to the imaging direction and a configuration enabling measurement of the amount of deviation only in one direction perpendicular to the imaging direction. In the present embodiment, any of them can be employed.

The processing machine 1 may further have a third drive source (Z-axis drive source 29Z), a third sensor (Z-axis sensor 31Z), and a camera 47. The Z-axis drive source 29Z may relatively move the workpiece holding part (table 23) and the tool holding part (spindle 19) in a third direction (Z-direction) perpendicular to the first direction (X-direction). The Z-axis sensor 31Z may detect the relative positions of the table 23 and the spindle 19 in the Z-direction. The camera 47 may capture the tool 101 from the direction (for example Y-direction) crossing (for example perpendicular) the Z-direction. The reference workpiece holding part (in the present embodiment, the table 23 provided as the workpiece holding part is used also as the reference workpiece holding part) may relatively move in the Z-direction with respect to the spindle 19 along with the relative movements of the workpiece holding part (table 23) and the spindle 19 in the Z-direction by the Z-axis drive source 29Z. The processing control part 59 may perform control of the Z-axis drive source 29Z based on the detection value of the Z-axis sensor 31Z to process the workpiece 103 by the tool 101. The tool deviation identification part 55*d* may identify the third amount of deviation of the position of the tool 101 in the Z-direction based on the image captured by the camera 47. The correction processing part 55*e* may correct the control of the processing control part 59 based on the above identified third amount of deviation.

In this case, for example, the amount of deviation of the tool 101 in the Z-direction is measured in addition to the X-direction (and Y-direction), and the measured amount of deviation is used for correction of the control of the processing, therefore the precision of processing is improved. Further, for example, the amount of deviation of the tool 101 in at least one direction is measuredly the camera 47. Therefore, compared with the mode where the amounts of deviation in all directions (for example 3 directions) are measured by the touch sensor 33 and reference workpiece 105 (this mode is also included in the art according to the present disclosure), the versatility is improved. For example, depending on the type of the tool 101, sometimes processing of the reference workpiece 105 in two or more directions is difficult. In turn, sometimes it is difficult to apply the method of measurement of the amount of deviation using the reference workpiece 105 with respect to all directions. Even in this case, the amounts of deviation of the tool 101 in a plurality of directions can be measured.

The control device 51, like in the processing procedure illustrated in FIG. 7A to FIG. 9B, may repeat the processing by the reference workpiece processing part 55*a* (FIG. 7A and FIG. 8B), the measurement by the reference workpiece measurement part 55*c* (FIG. 7C and FIG. 8D), and the correction by the correction processing part 55*e* (from another viewpoint, processing by the processing control part 59, FIG. 8A and FIG. 9B) during the period where the tool 101, workpiece 103, and reference workpiece 105 are not exchanged.

In this case, the detection sensitivity of the amount of deviation occurring during the processing is improved. In turn, the processing precision is improved.

(Variations)

Below, variations of the embodiment will be explained. In the following explanation, basically, only the difference from the embodiment will be explained. The matter which is not particularly explained may be the same as the embodiment or may be deduced from the embodiment. In the following explanation, configurations corresponding to the configurations in the embodiment, for convenience, will sometimes be assigned the notations of the embodiment even if there is a difference from the embodiment.

(Variations of Reference Workpiece and Reference Gauge)

In the embodiment, the reference workpiece 105 and the reference gauge 35 were made members which were different from each other. However, the two may be configured by mutually the same members as well. In other words, the reference gauge may be configured by a portion in the reference workpiece where the processing under control of the reference workpiece processing part 55*a* (processing for measurement of the amount of deviation of the position of the tool 101) is not executed.

Figure 10:
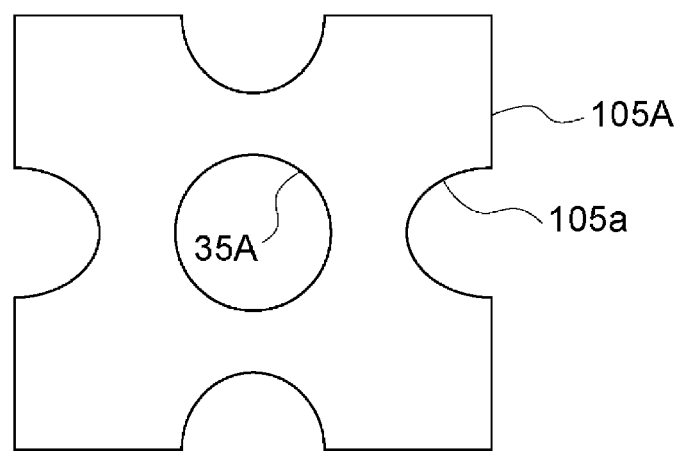
FIG. 10 is a plan view showing a reference workpiece according to a variation.

FIG. 10 is a plan view showing a reference workpiece 105A as one example of such a reference workpiece.

The reference workpiece 105A is configured by forming a through hole in the reference workpiece 105 in the embodiment at the center. The through hole can be utilized in the same way as the through hole in the ring-shaped reference gauge 35 in the embodiment. That is, the peripheral portion of the through hole in the reference workpiece 105A becomes a reference gauge 35A.

When the reference workpiece 105A and the reference gauge 35A are configured by the same member in this way, for example, reduction of the space for arranging the member is made easy. As a result, for example, the space for arranging the workpiece 103 is secured, while the likelihood of increase of size of the processing machine 1 can be reduced. Further, for example, change of design with respect to a known processing machine is reduced, and application of the technique according to the present disclosure an already provided processing machine is made easier.

(Another Example of Configuration of Guide)

Figure 11:
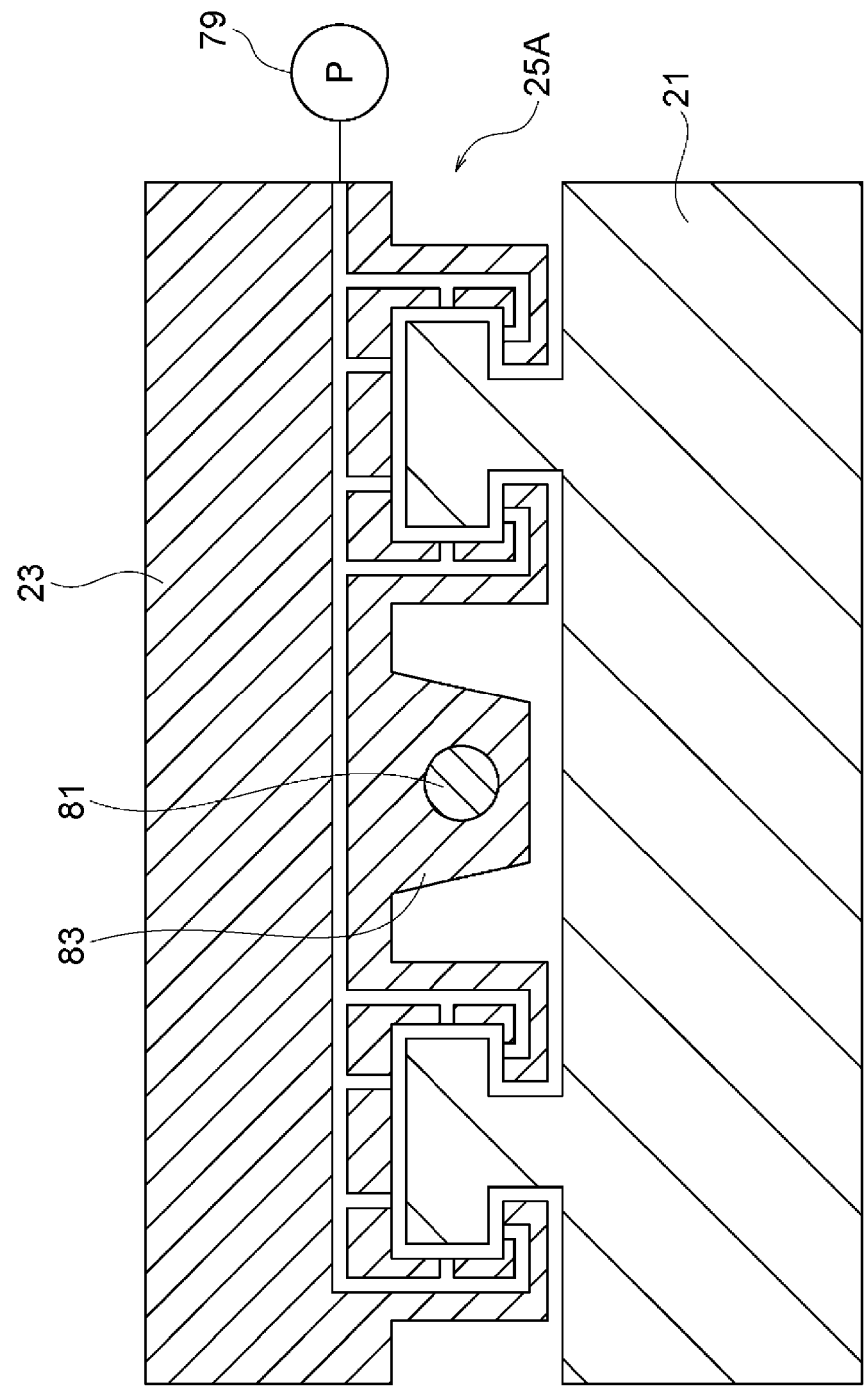
FIG. 11 is a view showing another example of the configuration from the example of the configuration explained with reference to FIG. 2B concerning a guide.

FIG. 11 is a view showing another example of the configuration concerning the guide guiding the table 23, saddle 13, or spindle head 17 from the example of the configuration explained with reference to FIG. 2B. This view is a cross-sectional view corresponding to FIG. 2B. For convenience of explanation, as the member guided by the guide, the table 23 will be taken as an example.

A guide 25A shown in FIG. 11 is configured by a so-called static pressure guide. Specifically, a gap is configured between the guided surface of the table 23 and the guide surface of the bed 21. Into the gap, a fluid is supplied with a predetermined pressure by a pump 79 etc. The fluid may be a gas (for example air) or may be a liquid (for example oil).

When the guide 25A is configured by a static pressure guide in this way, for example, the frictional resistance at the time when the table 23 is moved in its movement direction according to the NC program 107 is small, therefore the positioning in the movement direction can be carried out with a high precision. According to such a configuration, a high processing precision can be realized. As a result, the usefulness of correction based on the amount of deviation of the position of the tool 101 becomes high.

(Another Example of Drive Mechanism)

FIG. 11 described above is also a view showing an example of a configuration other than a linear motor as the configuration of the drive mechanism. Specifically, in FIG. 11, a screw shaft 81 and a nut 83 screwed with the screw shaft 81 are shown. That is, the screw mechanism (for example ball screw mechanism or sliding screw mechanism) is shown. In a state where one of the screw shaft 81 and the nut 83 (nut 83 in the example shown) is restricted in rotation, the other of the screw shaft 81 and the nut 83 (screw shaft 81 in the example shown) is rotated, thereby the two members relatively move in the axial direction. One of the screw shaft 81 and the nut 83 (screw shaft 81 in the example shown) is supported upon the bed 21, and the other of the screw shaft 81 and the nut 83 (nut 83 in the example shown) is supported on the table 23. The driving force rotating the screw shaft 81 (or nut 83) is for example generated by a rotary electric motor (not shown).

(Example of Configuration of Bearing of Spindle)

Figure 12:
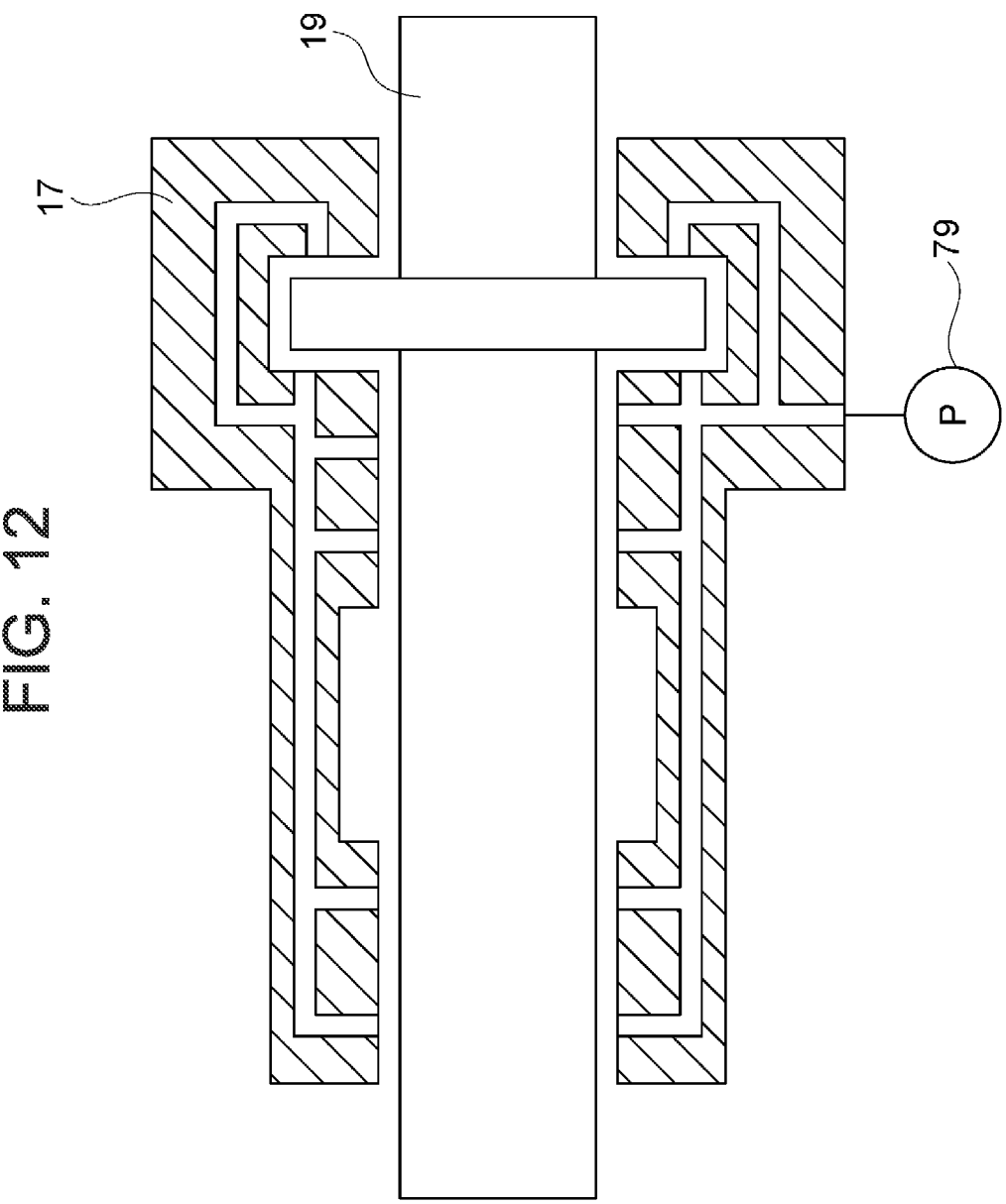
FIG. 12 is a cross-sectional view showing an example of the configuration of a bearing of a spindle in the processing machine in FIG. 1.

FIG. 12 is a cross-sectional view showing an example of the configuration of the bearing of the spindle 19.

As explained in the explanation of the embodiment, the bearing of the spindle 19 may be made for example a roller bearing, static pressure bearing, sliding bearing, or combination of two or more among them. In FIG. 12, the static pressure bearing is illustrated. Specifically, a gap is configured between the outer peripheral surface of the spindle 19 and the inner peripheral surface of the spindle head 17. To the gap, a fluid is supplied with a predetermined pressure by the pump 79 etc. The fluid may be a gas (for example air), or may be a liquid (for example oil).

When the spindle 19 is supported by a static pressure bearing in this way, for example, the frictional resistance at the time when the spindle 19 is rotated about the axis according to the NC program 107 is small, therefore the speed of rotation of the spindle 19 can be controlled with a high precision and in turn a high processing precision can be realized. As a result, the usefulness of correction based on the amount of deviation of the position of the tool 101 becomes high.

Note that, in the above embodiment and variations, the table 23 is one example of each of the workpiece holding part, reference workpiece holding part, and reference gauge holding part. The spindle 19 is one example of the tool holding part. The X-direction is one example of the first direction. The Y-direction is one example of the second direction. The Z-direction is one example of the third direction. The X-axis drive source 29X is one example of the first drive source. The Y-axis drive source 29Y is one example of the second drive source. The Z-axis drive source 29Z is one example of the third drive source. The X-axis sensor 31X is one example of the first sensor. The Y-axis sensor 31Y is one example of the second sensor. The Z-axis sensor 31Z is one example of the third sensor.

The technique according to the present disclosure is not limited to the above embodiment and variations and may be executed in various ways.

As explained also in the explanation of the embodiment, the processing machine is not limited to one having the configuration illustrated in FIG. 1. For example, the processing machine is not limited to a general machine tool. It may be a special one such as a superfine non-spherical processing machine as well. Further, the processing machine is not limited to a machine tool. It may be, for example, a robot as well. From another viewpoint, the program including the information of commands concerning movement is not limited to an NC program. It may be one generated by teaching as well. Further, for example, the processing machine may be a semiconductor manufacturing apparatus as well.

Further, the processing machine is not limited to one performing cutting, grinding, and/or polishing. For example, it may be one performing electric discharge machining as well. The processing may be one bringing the rotating tool into contact with a workpiece (and reference workpiece, same is true for the following description) which is not rotating as in the embodiment (for example milling). Otherwise, unlike the embodiment, it may be one bringing the tool which is not rotating into contact with a workpiece which is rotating (for example turning), may be one in which both of the workpiece and the tool 101 are rotating (for example grinding and/or polishing), or may be one in which neither the workpiece nor the tool is rotating.

The reference workpiece may be configured by part of the workpiece as well. For example, a workpiece sometimes has a portion which is the portion unnecessary in the final product and is not removed by the processing machine 1 (processing control part 59). Such a portion may be utilized as the reference workpiece as well.

The processing machine has at least one axis which is parallel to the first direction as the axis moving the workpiece and/or tool in parallel. In other words, the processing machine need not have three axes concerning parallel movements either. For example, the processing machine may have only one axis or only two axes. Conversely, it may have four or more axes as well. Further, the processing machine may include a configuration able to perform positioning of the workpiece and the tool in the rotation direction.

REFERENCE SIGNS LIST

1 . . . processing machine, 19 . . . spindle (tool holding part), 23 . . . table (workpiece holding part, reference workpiece holding part), 29X . . . X-axis drive source (first drive source), 31X . . . X-axis sensor (first sensor), 33 . . . touch sensor, 51 . . . control device, 55 . . . correction part, 55a . . . reference workpiece processing part, 55c . . . reference workpiece measurement part, 55d . . . tool deviation identification part, 55e . . . correction processing part, 59 . . . processing control part, 101 . . . tool, and 103 . . . workpiece.

The invention claimed is:

1. A processing machine comprising:
a table configured to hold a workpiece;
a spindle configured to hold a tool;
a first motor configured to move the table and the spindle relative to one another in a first direction;
a first sensor configured to detect relative positions of the table and the spindle in the first direction;
a touch sensor which is arranged at a position having a certain positional relationship with the spindle and thereby relatively moves in the first direction with respect to the table along with the relative movements of the table and the spindle in the first direction by the first motor;
a control device configured to control the first motor based on detection values of the first sensor; and
a reference workpiece holding part configured to hold a reference workpiece for measuring a deviation of the position of the tool, and that relatively moves in the first direction with respect to the spindle along with the relative movements of the table and the spindle in the first direction by the first motor, wherein
the control device comprises at least one processor and at least one memory storing instructions that, when executed by the at least one processor, implement the following:
a processing control part configured to control the first motor based on the detection values of the first sensor and thereby process the workpiece by the tool and
a correction part configured to correct the control of the processing control part, the correction part comprising:
a reference workpiece processing part configured to control the first motor based on the detection values of the first sensor so that the reference workpiece is processed from the first direction by the tool from an initial shape and becomes a predetermined target shape,
a reference workpiece measurement part configured to measure a shape of the reference workpiece based on
touch sensor position information stored and showing correspondence between a position of the touch sensor and the detection values of the first sensor and
a detection value of the first sensor at a time when contact in the first direction of the touch sensor with respect to the reference workpiece after processing is detected by the touch sensor,
a tool deviation identification part configured to identify a first amount of deviation of a position of the tool in the first direction based on an amount of deviation in the first direction between the target shape and the shape measured, and
a correction processing part configured to correct the control of the processing control part based on the first amount of deviation identified.

2. The processing machine according to claim 1, wherein a position at which the control device positions the tool when processing the reference workpiece is a position at which an object held by the workpiece holding part is processed, and the table acts also as the reference workpiece holding part and is configured to hold the workpiece and the reference workpiece so that the workpiece and the reference workpiece become unable to relatively move with respect to each other.

3. The processing machine according to claim 1, wherein
the reference workpiece processing part is configured to control the first motor so that the reference workpiece is processed from one side in the first direction, and then processed from the other side in the first direction, and
the tool deviation identification part, as the first amount of deviation, is configured to identify an amount of deviation between the target shape and the shape measured for a representative position calculated based on a position of a part processed from the one side in the first direction and a position of a part processed from the other side in the first direction.

4. The processing machine according to claim 1, further comprising a reference gauge holding part configured to hold a reference gauge for measuring a deviation of position of the touch sensor and relatively move in the first direction with respect to the spindle along with the relative movements of the table and the spindle in the first direction by the first motor, wherein
the correction part further comprises a touch sensor calibration part configured to calibrate the touch sensor position information based on an amount of deviation between a position of the reference gauge based on a detection value of the first sensor at the time when contact in the first direction of the touch sensor with respect to the reference gauge is detected by the touch sensor and a position of the reference gauge which is stored in advance, and
the reference workpiece measurement part is configured to measure the shape of the reference workpiece based on the touch sensor position information calibrated.

5. The processing machine according to claim 4, wherein a position at which the control device positions the touch sensor into contact with the reference gauge is a position at which the touch sensor comes into contact with an object held by the workpiece holding part, and the table acts also as the reference gauge holding part and is configured to hold the workpiece and the reference workpiece so that the workpiece and the reference gauge become unable to relatively move with respect to each other.

6. The processing machine according to claim 4, wherein the reference gauge is configured by a portion in the reference workpiece which is not processed under control of the reference workpiece processing part.

7. The processing machine according to claim 1, wherein
the control device further comprises a position identification part configured to identify correspondence between relative positions of the workpiece and the tool and the detection values of the first sensor based on a detection value of the first sensor at the time when contact of the touch sensor with respect to the workpiece is detected by the touch sensor, and
the processing control part is configured to control the first motor based on the correspondence identified and the detection values of the first sensor.

8. The processing machine according to claim 1, further comprising:

a second motor configured to move the table and the spindle relative to one another in a second direction perpendicular to the first direction; and a second sensor configured to detect relative positions of the table and the spindle in the second direction, wherein the reference table relatively moves in the second direction with respect to the spindle along with relative movements of the table and the spindle in the second direction by the second motor, the processing control part is configured to control the second motor based on detection values of the second sensor and thereby process the workpiece by the tool, the reference workpiece processing part is configured to control the second motor based on the detection values of the second sensor so that the reference workpiece is processed from the second direction by the tool to become the target shape, the reference workpiece measurement part is configured to measure the shape of the reference workpiece based on a detection value of the second sensor at the time when contact in the second direction of the touch sensor with respect to the reference workpiece after processing is detected by the touch sensor and the touch sensor position information showing the correspondence between the position of the touch sensor and the detection values of the second sensor, the tool deviation identification part is configured to identify a second amount of deviation of a position of the tool in the second direction based on an amount of the deviation in the second direction between the target shape and the shape measured, and the correction processing part is configured to correct the control of the processing control part based on the second amount of deviation identified.

9. The processing machine according to claim 1, further comprising:

a third motor configured to move the table and the spindle relative to one another in a third direction perpendicular to the first direction;

a third sensor configured to detect relative positions of the table and the spindle in the third direction; and a camera configured to capture an image of the tool from a direction perpendicular to the third direction, wherein the reference table relatively moves in the third direction with respect to the spindle along with relative movements of the table and the spindle in the third direction by the third motor, the processing control part is configured to control the third motor based on detection values of the third sensor and thereby process the workpiece by the tool, the tool deviation identification part is configured to identify a third amount of deviation of a position of the tool in the third direction based on the image captured by the camera, and the correction processing part is configured to correct the control of the processing control part based on the third amount of deviation identified.

10. The processing machine according to claim 1, wherein the control device is configured to repeat processing by the reference workpiece processing part, measurement by the reference workpiece measurement part, and correction by the correction processing part during a period in which the tool, the workpiece, and the reference workpiece are not exchanged.

11. A method for manufacturing a processed object, comprising using the processing machine according to claim 1, bringing the workpiece and the tool into contact, and processing the workpiece into a processed object.

12. The method according to claim 11, wherein the table acts also as the reference workpiece holding part and holds the workpiece and the reference workpiece so that the workpiece and the reference workpiece become unable to relatively move with respect to each other.

13. A method for manufacturing a processed object, comprising using the processing machine according to claim 4, bringing the workpiece and the tool into contact, and processing the workpiece into a processed object.

14. The method according to claim 13, wherein the table acts also as the reference gauge holding part and holds the workpiece and the reference workpiece so that the workpiece and the reference gauge become unable to relatively move with respect to each other.

* * * * *